(12) United States Patent
Racine et al.

(10) Patent No.: US 6,695,398 B2
(45) Date of Patent: Feb. 24, 2004

(54) SPOILER SUNROOF MECHANISM

(75) Inventors: Lloyd George Racine, Shelby, MI (US); Joseph J. Kalamajka, Jr., Sterling Heights, MI (US); Lisa M. Sahlaney, Waterford, MI (US); Pamela A. Sheridan, Macomb Twp., MI (US)

(73) Assignee: Webasto Sunroofs, Inc., Rochester Hill, MI (US)

( * ) Notice: Subject to any disclaimer, the term of this patent is extended or adjusted under 35 U.S.C. 154(b) by 0 days.

(21) Appl. No.: 10/167,505

(22) Filed: Jun. 13, 2002

(65) Prior Publication Data

US 2003/0230911 A1 Dec. 18, 2003

(51) Int. Cl.$^7$ ................................................ B60J 10/12
(52) U.S. Cl. .............................. 296/216.03; 296/216.01
(58) Field of Search ...................... 296/216.01, 216.02, 296/216.03, 223, 224, 221

(56) References Cited

U.S. PATENT DOCUMENTS

| | | | |
|---|---|---|---|
| 3,789,645 A | | 2/1974 | Schmid |
| 4,678,228 A | | 7/1987 | Boots |
| 4,679,846 A | | 7/1987 | Lux et al. |
| 4,684,169 A | * | 8/1987 | Igel et al. ................... 296/221 |
| 4,763,949 A | * | 8/1988 | Haig ........................... 296/224 |
| 4,802,707 A | | 2/1989 | Schlapp |
| 4,869,548 A | | 9/1989 | Nagata et al. |
| 4,895,410 A | | 1/1990 | Grimm et al. |
| 4,968,088 A | | 11/1990 | Schürmann |
| 4,971,386 A | | 11/1990 | Böhm et al. |
| 5,092,651 A | * | 3/1992 | Baldwin et al. ............ 296/223 |
| 5,413,390 A | | 5/1995 | Filippi |
| 5,464,267 A | | 11/1995 | Racine et al. |
| 5,516,187 A | | 5/1996 | Zani et al. |
| 6,062,637 A | | 5/2000 | Hoffmann |
| 6,129,413 A | * | 10/2000 | Klein ...................... 296/220.01 |
| 6,155,636 A | | 12/2000 | Stehning et al. |
| 6,158,803 A | * | 12/2000 | Reihl et al. ............. 296/216.01 |
| 6,164,718 A | | 12/2000 | Stallfort |
| 6,199,944 B1 | | 3/2001 | Lee et al. |
| 6,325,453 B1 | * | 12/2001 | Manders ....................... 296/223 |
| 6,361,104 B2 | * | 3/2002 | Tsuruo et al. .......... 296/216.02 |
| 6,394,540 B1 | * | 5/2002 | Manders ....................... 296/223 |
| 6,419,309 B1 | * | 7/2002 | Kaandorp et al. ........... 296/223 |
| 6,419,310 B1 | * | 7/2002 | Manders ....................... 296/223 |
| 6,428,093 B1 | * | 8/2002 | Farmont et al. ......... 296/216.03 |
| 6,454,347 B2 | * | 9/2002 | Lee et al. ............... 296/216.03 |
| 6,494,529 B1 | * | 12/2002 | Manders ....................... 296/222 |
| 6,513,866 B1 | * | 2/2003 | Manders ................. 296/216.03 |

FOREIGN PATENT DOCUMENTS

EP          1095807 A1    10/2000

* cited by examiner

Primary Examiner—D. Glenn Dayoan
Assistant Examiner—Lori L Coletta
(74) Attorney, Agent, or Firm—Pillsbury Winthrop, LLP

(57) ABSTRACT

A sunroof assembly is provided for a vehicle having a roof with an opening. The assembly includes a panel structure, a pair of lift arms coupled to the panel structure, and a pair of track members. Each lift arm has a pair of cam structures providing a camming surface on each opposing side thereof. A pair of lifting cam structures are slidably coupled to each track member and have supports positioned on each lateral side of its respective lift arm to resist deflection of the lift arms. The lifting cam structures have camming surfaces engaged with camming surfaces of the cam structures. The lifting cam structures and the camming surfaces of the lift arms are configured such that sliding movement of the lifting cam structures along the track members relative to the lift arms creates a camming action to raise the lift arms.

12 Claims, 28 Drawing Sheets

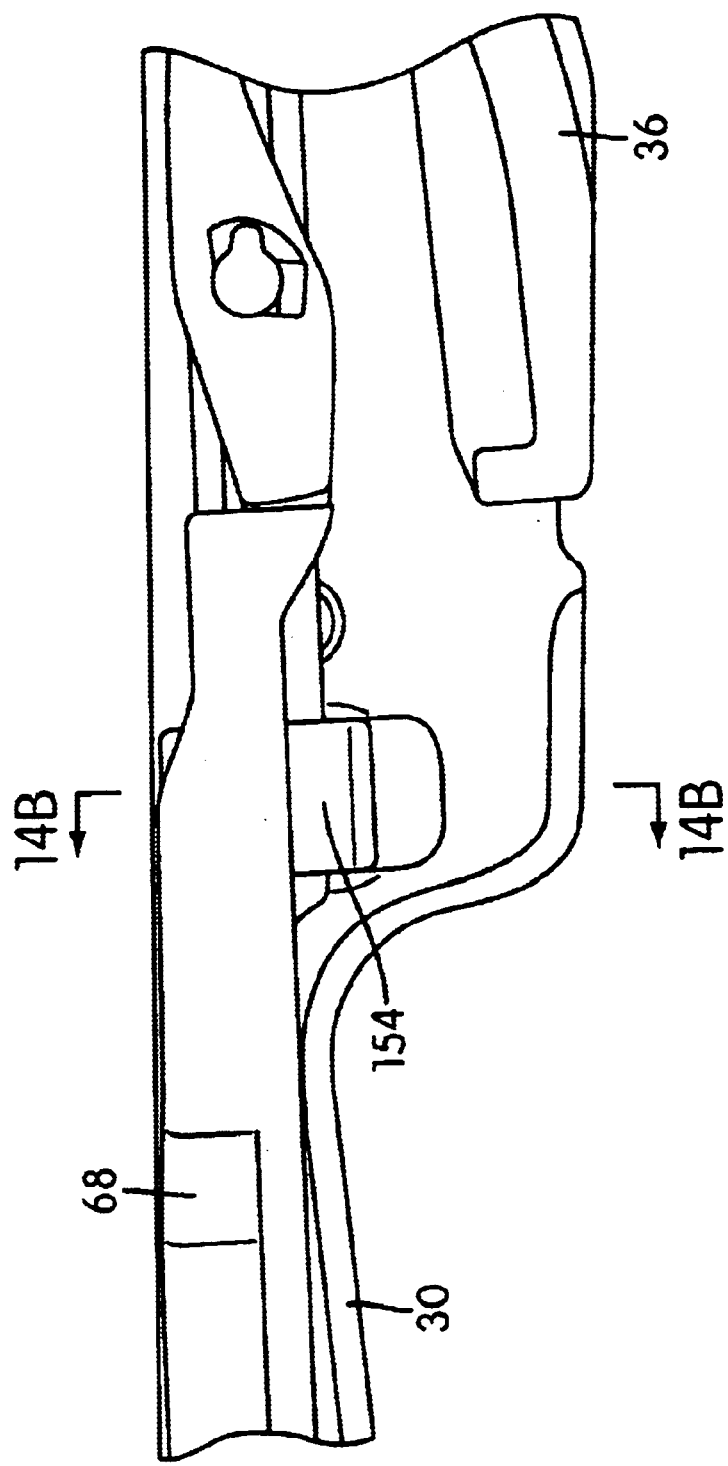

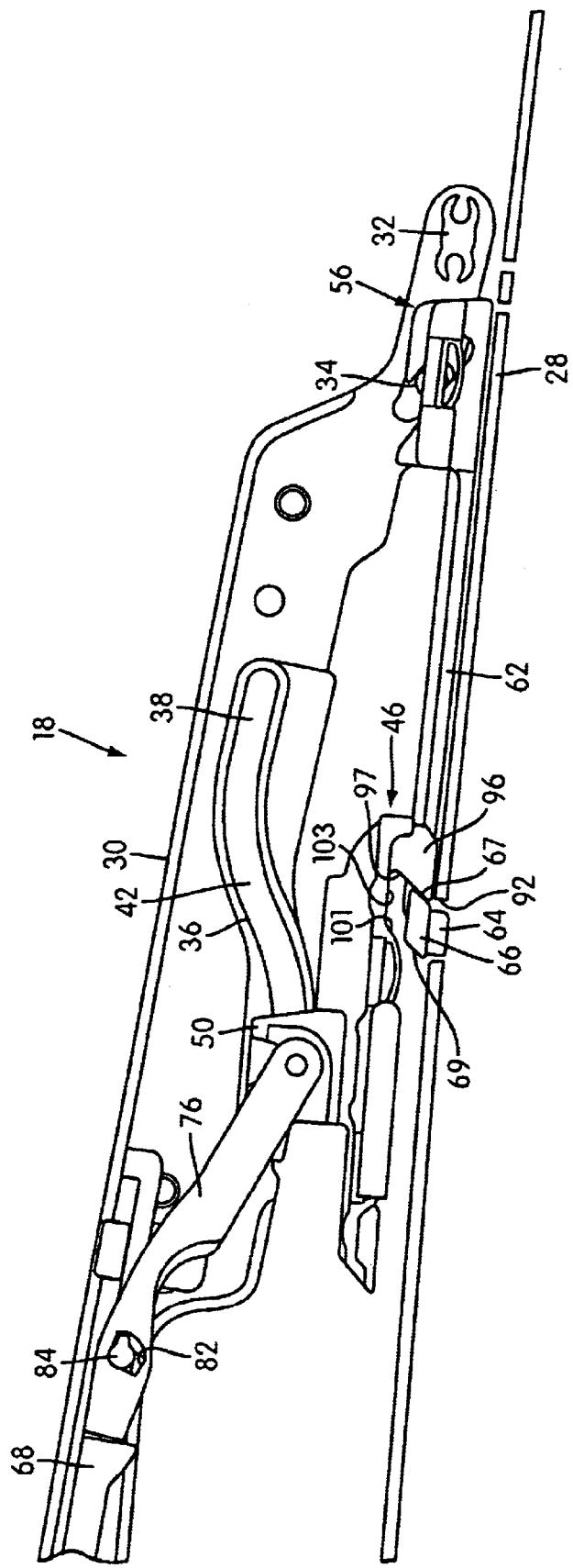

SPOILER SUNROOF MECHANISM

BACKGROUND OF THE INVENTION

1. Field of the Invention

The present invention relates to spoiler sunroofs and, more particularly, to an improved mechanism for a spoiler sunroof.

2. Description of Related Art

A sunroof for a vehicle generally includes a panel that is movable with respect to an opening in the roof of the vehicle. A spoiler type sunroof, such as one disclosed in U.S. Pat. No. 5,464,267 the disclosure of which is hereby incorporated by reference herein, is capable of moving between (1) a closed position wherein the sunroof panel substantially seals the opening in the roof, (2) a vent position wherein the panel is angled relative to the roof such that a rearward end of the panel is disposed above the roof, and (3) an open position wherein the sunroof panel is disposed substantially rearwardly of the opening. Specifically, the typical spoiler sunroof includes a pair of tracks on each of which is mounted a lift arm and lift mechanism. The lift arms are connected to the panel and are operatively connected to the lift mechanism so that the lift arms may be pivoted about a forward pivot point. This design requires that the panel be supported in a somewhat cantilevered manner, since all but a forward portion of the sunroof panel is disposed behind the opening when the panel is in the open position.

As such, designs for spoiler type sunroof mechanisms have tended to be somewhat complicated to be able to effect the desired movement of the panel. Additionally, as the sunroof panels are disposed above the roof in the vent and open positions, there is a relatively large force directed onto the panel when the vehicle is moving due to the wind resistance of the panel. Therefore, the mechanisms to support the panel need to be relatively strong to stably support the panel and resist deflection of the mechanism and possible damage to the mechanism itself and/or the panel. However, in previous designs the lift mechanism supports the lift arm on only one side and exerts lifting and support force on the lift arm via that side of the lift arm. This "single shear support" of the lift arm may allow the lift arm to flexurally displace when a force is exerted on the panel. The displacement of the lift arm can cause damage to the arm itself, the panel, or the mechanism.

SUMMARY OF THE INVENTION

One aspect of the present invention provides a sunroof assembly for a vehicle having a roof and an opening therein. The assembly includes a panel structure of a size to close the opening and a pair of elongate track members extending in a longitudinal direction relative to the vehicle and constructed to be mounted to the roof side edge portions of the opening. The assembly also includes a pair of lift arms coupled to the panel structure proximate respective side edge portions thereof. Each lift arm is coupled to one of the track members so as to be capable of (1) pivotal vertical movement to move the panel structure relative to the track members between (a) a closed position wherein the panel structure closes the opening of the roof and (b) a vent position wherein the panel structure is disposed at an angle relative to the opening to provide a vent space between the panel structure and the opening, and (2) sliding movement relative to the track members between (a) the vent position and (b) an open position wherein the panel structure is moved along the track members to uncover the opening. Each lift arm has a cam structure providing a camming surface on each opposing lateral side thereof. The assembly also includes a pair of lifting cam structures slidably coupled to each track member. The lifting cam structures have supports positioned on each lateral side of its respective lifting arm to resist deflection of the lifting arms. The lifting cam structures have camming surfaces engaged with the camming surfaces of the cam structures on the opposing lateral sides of the lift arms. The lifting cam structures and the camming surfaces of the lift arms are configured such that sliding movement of the lifting cam structures along the track members relative to the lift arms creates a camming action to raise the lift arms from the closed position to the vent position.

Other objects, features, and advantages will become apparent from the following detailed description, the accompanying drawings, and the appended claims.

BRIEF DESCRIPTION OF THE DRAWINGS

FIG. 14A is a partial side view of one of the lift arms;

FIG. 20 is a side view of the lift arm when in the vent position;

DETAILED DESCRIPTION OF ILLUSTRATED EMBODIMENT

Figure 1:
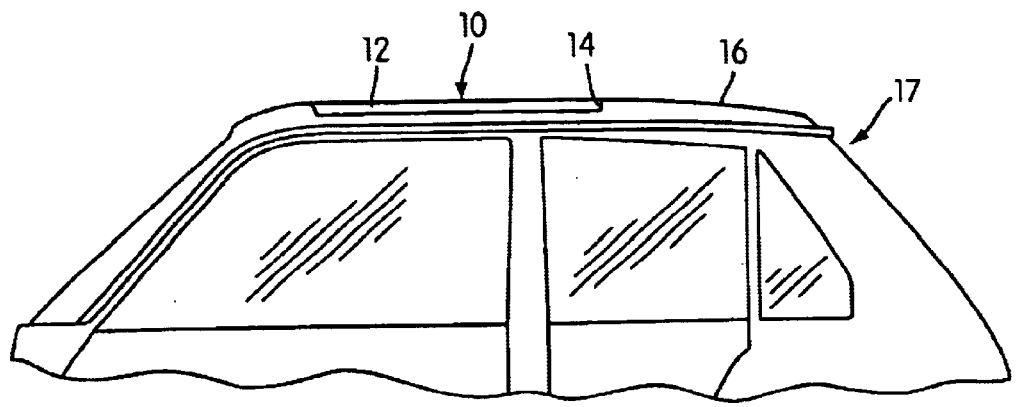
FIGS. 1–3 are side views of a vehicle with a sunroof mechanism according to principles of the present invention in closed, vent, and open positions, respectively.
Figure 2:
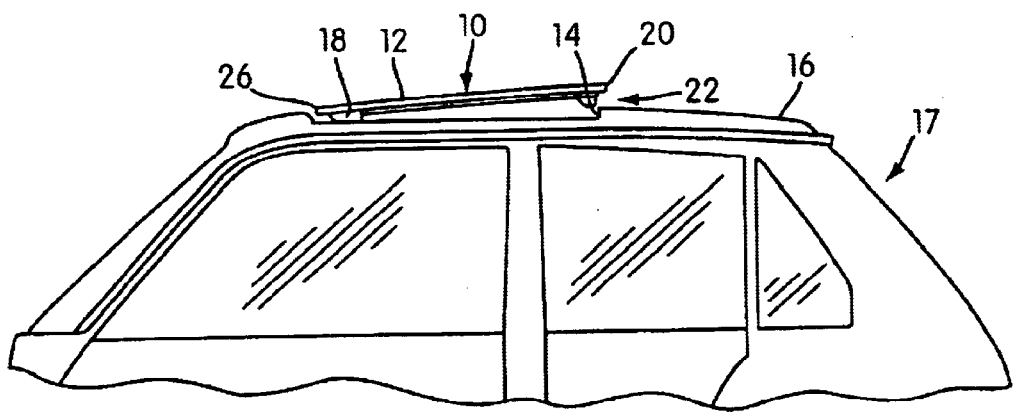
Figure 3:
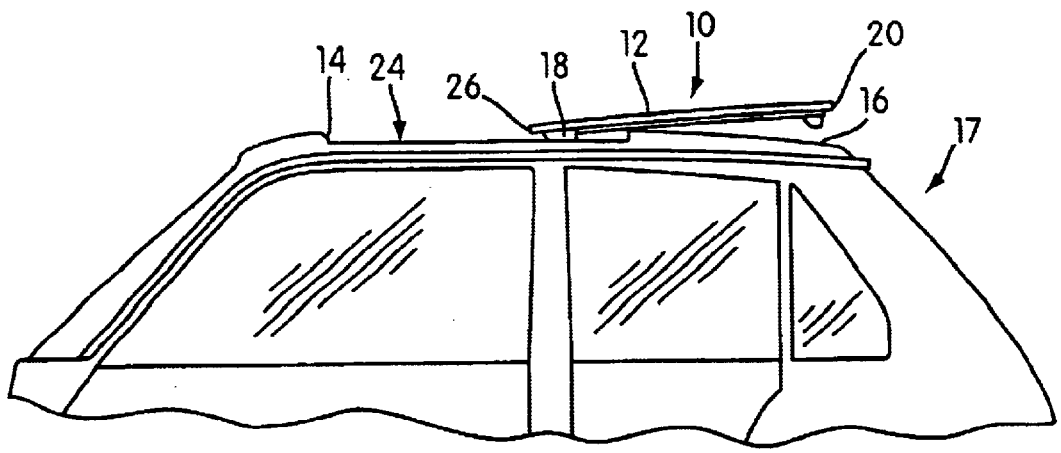

FIGS. 1–3 illustrate a spoiler sunroof assembly, indicated at 10, embodying principles of the present invention in various positions thereof. As shown in FIG. 1, the spoiler sunroof mechanism 10 includes a sunroof panel 12 of a size to cooperate with and substantially close a sunroof opening 14 within a roof 16 of a vehicle 17 when in a closed position relative to the opening 14. In the closed position, an outer peripheral edge of the sunroof panel 12 is sealingly engaged with a cooperating interior peripheral edge of the sunroof opening 14 to thereby prevent leakage therebetween. The peripheral edge of the sunroof panel 12 may optionally have attached thereto a gasket or other sealing element to facilitate the seal between the sunroof panel 12 and the roof 16. The interior peripheral edge of the sunroof opening 14 may also optionally include a gasket or other sealing element with which the outer peripheral edge of the sunroof panel 12 engages in sealing relation.

FIG. 2 shows the sunroof panel 12 in a vent position relative to the opening 14. As shown, a pair of lift arms 18 are coupled between the sunroof panel 12 and the roof 16 to allow the sunroof panel 12 to be moved at an angle relative to the opening 14 between the vent and closed positions. In the vent position, the sunroof panel 12 is angled upwardly about its forward end portion 26 so that a rearward end portion 20 of the sunroof panel 12 is disposed above the roof 16 to define a vent opening 22 therebetween. It may be preferable for the sunroof panel 12 to be angled in this manner relative to the roof 16, as shown in FIG. 2, so that during forward movement of the vehicle 17 the angled sunroof panel 12 effects a minimal amount of wind resistance.

FIG. 3 shows the sunroof panel 12 in an open position relative to the opening 14. As shown, in the open position, the sunroof panel 12 is displaced rearwardly relative to the opening 14 to define an open space 24 between a forward interior edge of the opening 14 and a forward end portion 26 of the sunroof panel 12. As also shown, the panel 12 is disposed at an angle relative to the opening 14, similarly as in the vent position shown in FIG. 2. In the open position of the sunroof panel 12, portions of the sunroof panel 12 and the lift arms 18 are disposed rearwardly of the opening 14 and in overlying relation relative to a rearward portion of the roof 16.

Figure 4:
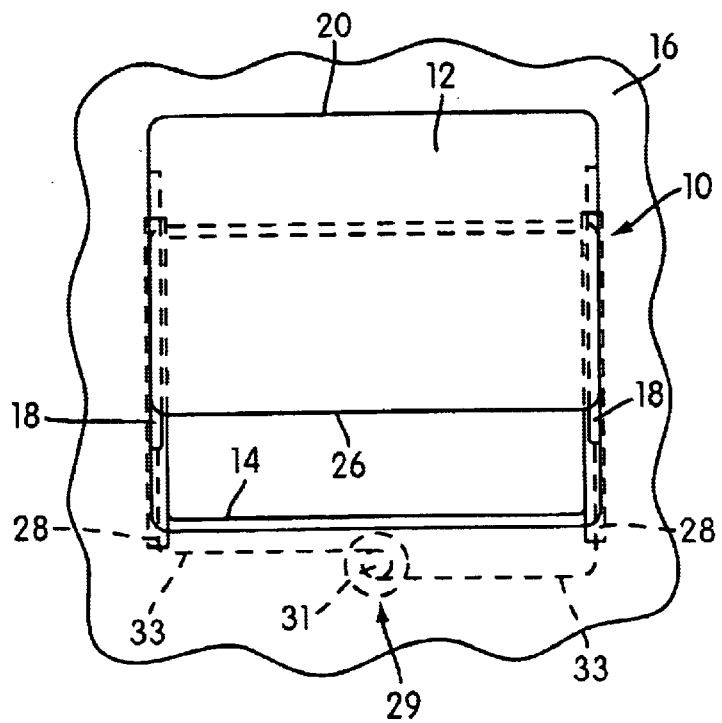
FIG. 4 is a schematic top view of the sunroof mechanism shown in FIGS. 1–3.

FIG. 4 schematically shows the sunroof panel 12 in a partially open position relative to the opening 14, such as between the vent position and the open position thereof. As shown, a pair of lift arms 18 are connected at opposing lateral sides of the sunroof panel 12 and are coupled to track members 28, which are connected to the roof 16 adjacent opposing lateral edges of the opening 14. As will be discussed in further detail below, the lift arms 18 are pivotally and slidably mounted within track portions of the track members 28.

FIG. 4 also illustrates a drive mechanism 29 coupled to the lift arms 18 to effect movement of the sunroof panel 12 between the closed, vent, and open positions. The drive mechanism 29 may include a driving unit 31 (e.g., a power or hand operated device) that is drivingly coupled with the lift arms 18 with, for example, cables 33. A contemplated, but only exemplary, connection of the cables 33 to the lift arms 18 will be discussed in greater detail below. By manipulation of the driving unit 31, a user may effect movement of the sunroof panel 12 into the various positions thereof. It is contemplated that the drive mechanism 29 may be of conventional design. The drive mechanism 29 may be similar to that described in U.S. Pat. No. 5,464,267.

Figure 5:
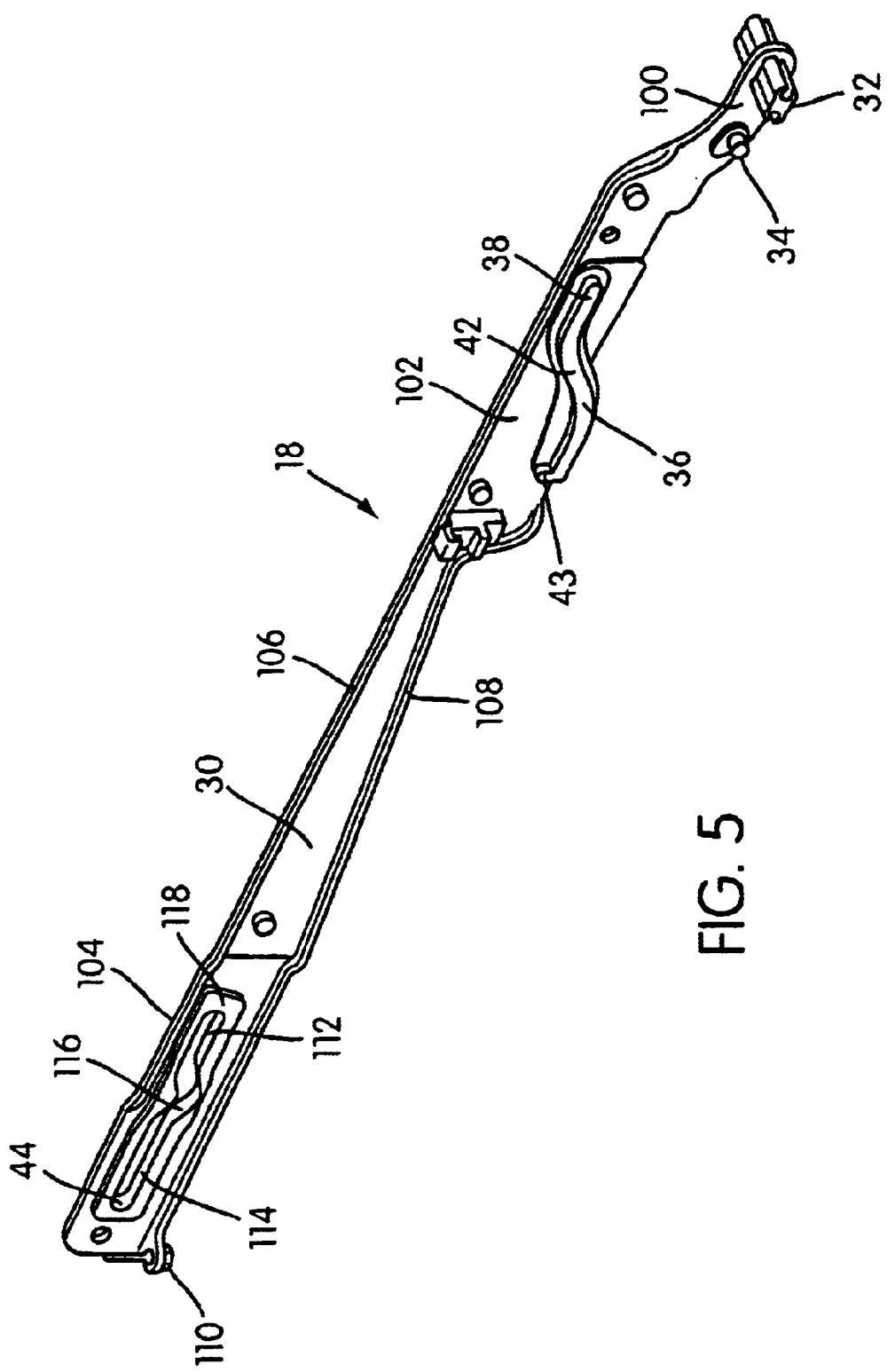
FIGS. 5 and 6 are perspective views of one of the arm portions of the sunroof mechanism.
Figure 6:
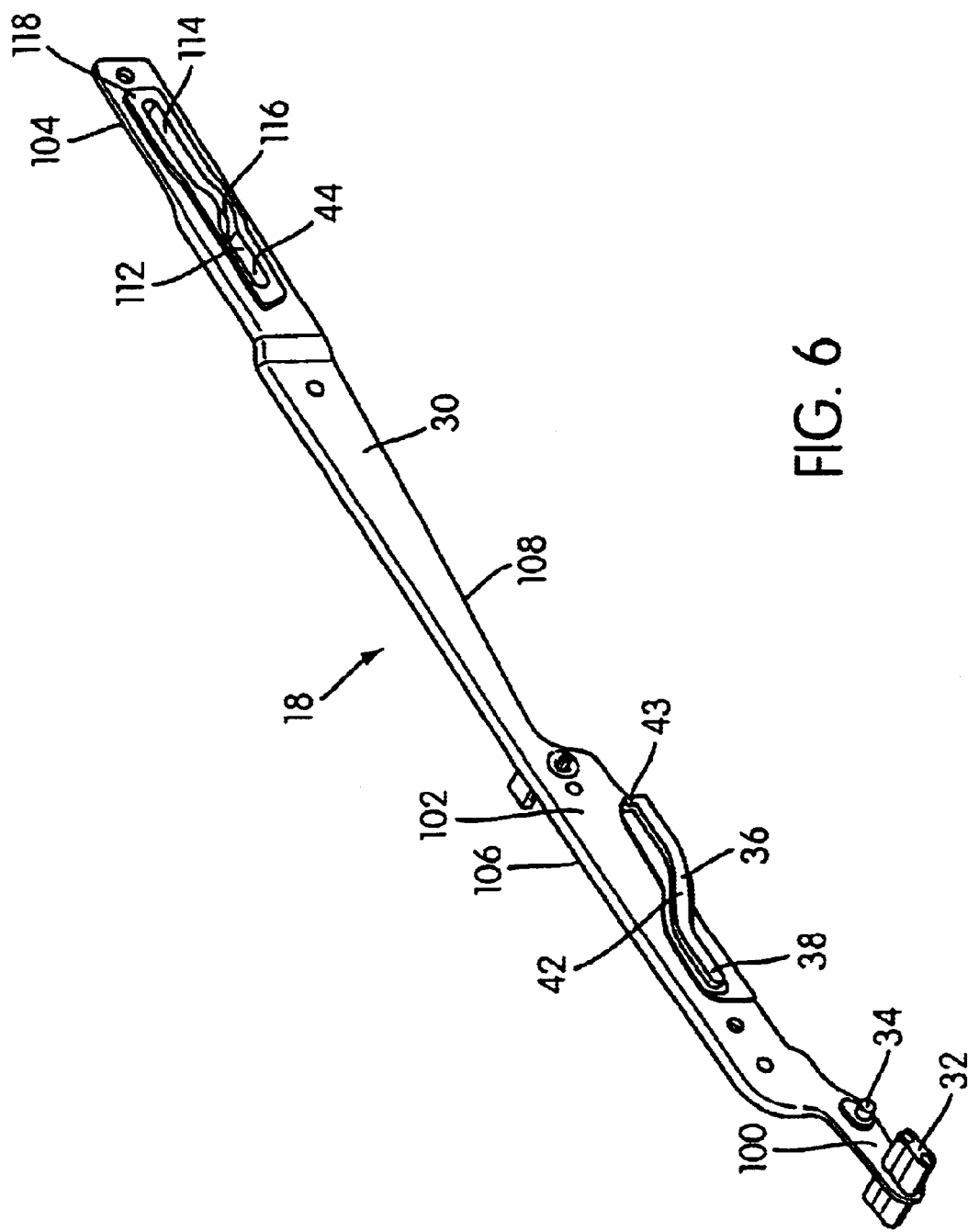

FIGS. 5 and 6 show one of the pair of lift arms 18. As shown, each lift arm 18 includes a longitudinally extending arm portion 30. Each arm portion 30 includes a forwardly extending portion 100. The arm portion 30 may also include an intermediate portion 102 disposed between the forward portion 100 and a rearward portion 104. As shown, the rearward portion 104 may optionally be generally laterally offset from the intermediate portion 102. As also shown, an upper edge portion of the intermediate portion 102 may optionally include an upper longitudinally extending stiffening flange 106. The flange 106 is curved away from the upper edge of the intermediate portion 102 so as to extend slightly horizontally. A portion of an upper edge of the rearward portion 104 may define a rearward portion of the flange 106. A lower edge of the intermediate portion 102 of the arm portion 30 may also optionally include a lower longitudinally extending stiffening flange 108. A lower edge of the rearward portion 104 may define a portion of the lower stiffening flange 108. The upper and lower stiffening flanges 106, 108 provide a degree of flexural and torsional rigidity to the arm portion 30. As also shown in FIG. 5, a rearward portion of the lower stiffening flange 108 may optionally have attached thereto a bumper member 110, which is used as a cushion between the roof 16 and the rearward portion 104 of the arm portion 30.

The arm portion 30 may be formed, for example, from stamping or forming a sheet of metal material. However, the arm portion 30 may also be formed from any suitable material, such as rigid polymer materials or composite materials and also be formed from any suitable process.

The forward portion of each arm portion 30 includes a connecting structure 32 that is received within a track portion of the track member 28 so as to be capable of both sliding movement along the track member 28 and pivotal movement relative to the track member 28 about a pivot axis defined by the connecting structure 32. Just rearward of the connecting structure 32, the forward portion 100 of the arm portion 30 includes a pair of generally circular lug members 34, which will be discussed further below, that extend outwardly from opposing lateral sides of the arm portion 30.

Figure 6A:
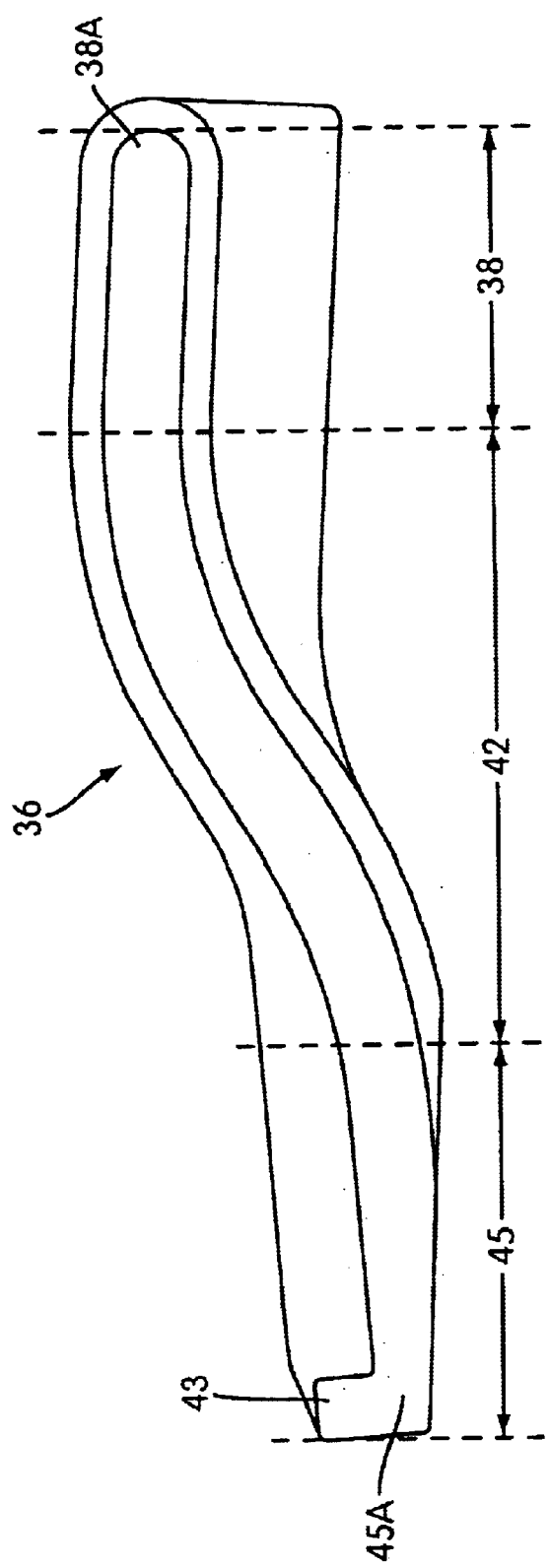
FIG. 6A is a side view of one of the cam structures.

As shown in FIGS. 5 and 6, each lift arm 18 includes a pair of cam structures 36 on opposing lateral sides thereof. In the illustrated embodiment, each cam structure 36 is a generally outwardly extending protrusion extending from the respective lateral side of the lift arm 18. More specifically, the cam structures 36 are disposed on the intermediate portion 106 of the arm portion 30 of each lift arm 18. As shown in FIG. 6A, each cam structure 36 includes a forward portion, indicated at 38, a generally S-shaped arcuate intermediate portion 42, and a rearward portion 45. The forward portion 38 extends generally longitudinally relative to the lift arm 16 and is slightly declined toward a forward end 38A thereof. As also shown, the forward end 38A is preferably beveled, or rounded, to facilitate assembly of the lift arm 18. The rearward portion 45 also extends generally longitudinally relative to the lift arm 16 and is slightly declined toward a rearward end 45A thereof. The rearward portion 45 preferably includes a stop structure 43 adjacent the rearward end 45A. The intermediate portion 42 is disposed between and interconnects the forward and rearward portions 38, 45.

The cam structures 36 may be formed of a polymer material and bonded to the arm portion 30. The cam structures 36 may also be formed by over-molding a polymer material onto the corresponding portion of the intermediate portion 102 of the arm portion 30. The over-molding of the cam structures 36 may be preferable, since this process may be carried out relatively quickly and requires no extensive machining. Additionally, there is not an additional step required to attach the cam structures 36 to the arm portions 30. However, it is possible for the cam structures 36 to be formed of, e.g., metal, polymer, or composite material and subsequently bonded to the arm portions 30 or attached thereto with fasteners. The cam structures 36 may also be formed in one piece with the arm portion 30. Other suitable configurations are, of course, possible.

It may be preferable to form the cam structures 36 of a material (e.g., a polymer material) that possesses a relatively low coefficient of friction to facilitate efficient operation of the lift arms 18. It may also be preferable for the material of the cam structures 36 to provide relatively durable wear surfaces so as to prolong the operation life of the lift arms 18.

As also shown in FIGS. 5 and 6, each lift arm 18 may be provided with a slot 44 provided within the rearward portion 104 of the arm portion 30. The slot 44 extends generally horizontally through the rearward portion 104 and defines forward and rearward substantially straight portions 112, 114 and an intermediate arcuate portion 116 therebetween. A wear member 118 may optionally be formed to overlie the surfaces of the slot 44 so as to reduce a coefficient of friction thereof. The wear member 118 may be formed by overmolding a polymer material onto the corresponding portion of the rearward portion 104. As with the cam structures 36 described above, this arrangement may be advantageous for facilitating the operation of the sunroof assembly 10, as discussed below in greater detail.

Figure 7:
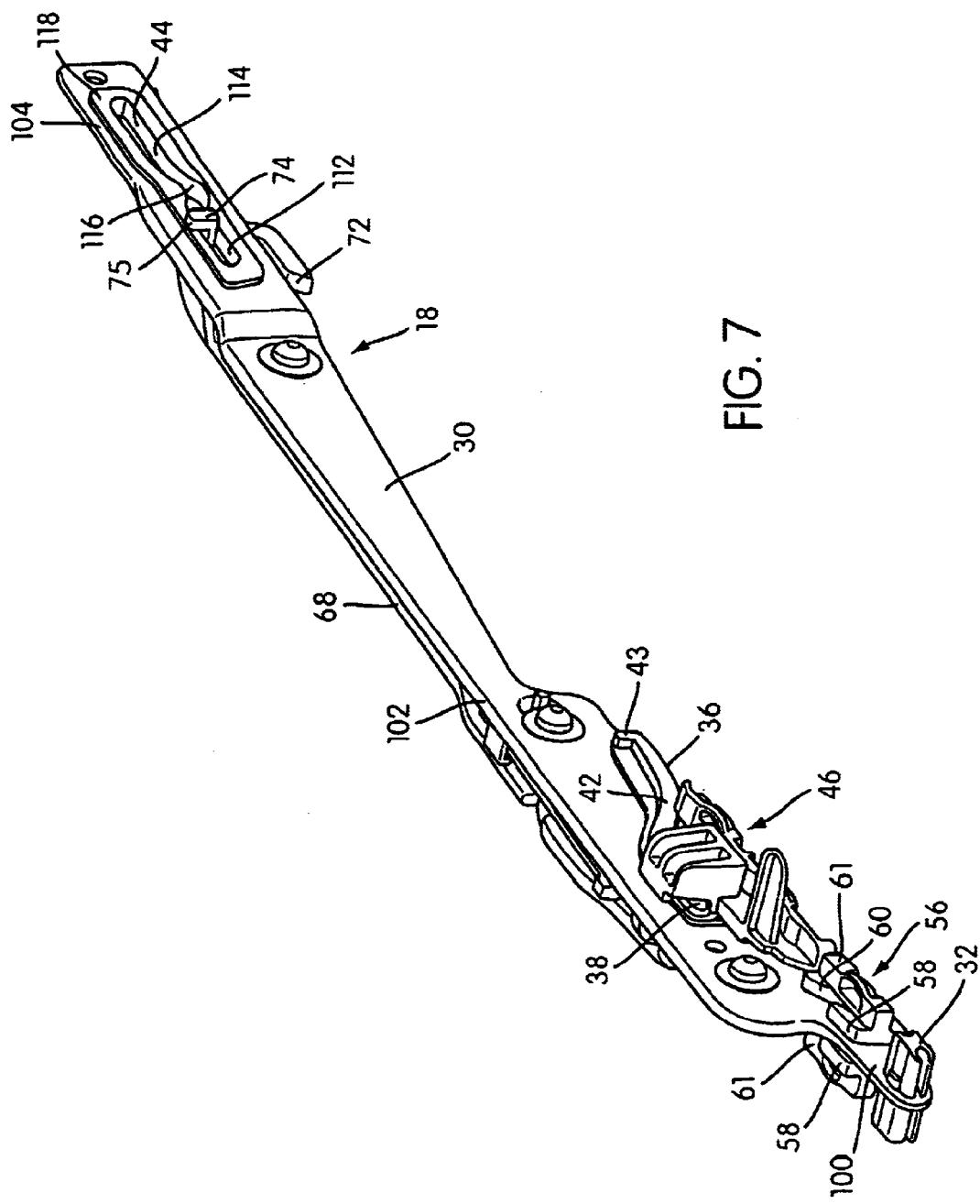
FIGS. 7 and 8 are perspective views of one of the lift arms of the sunroof mechanism.
Figure 8:
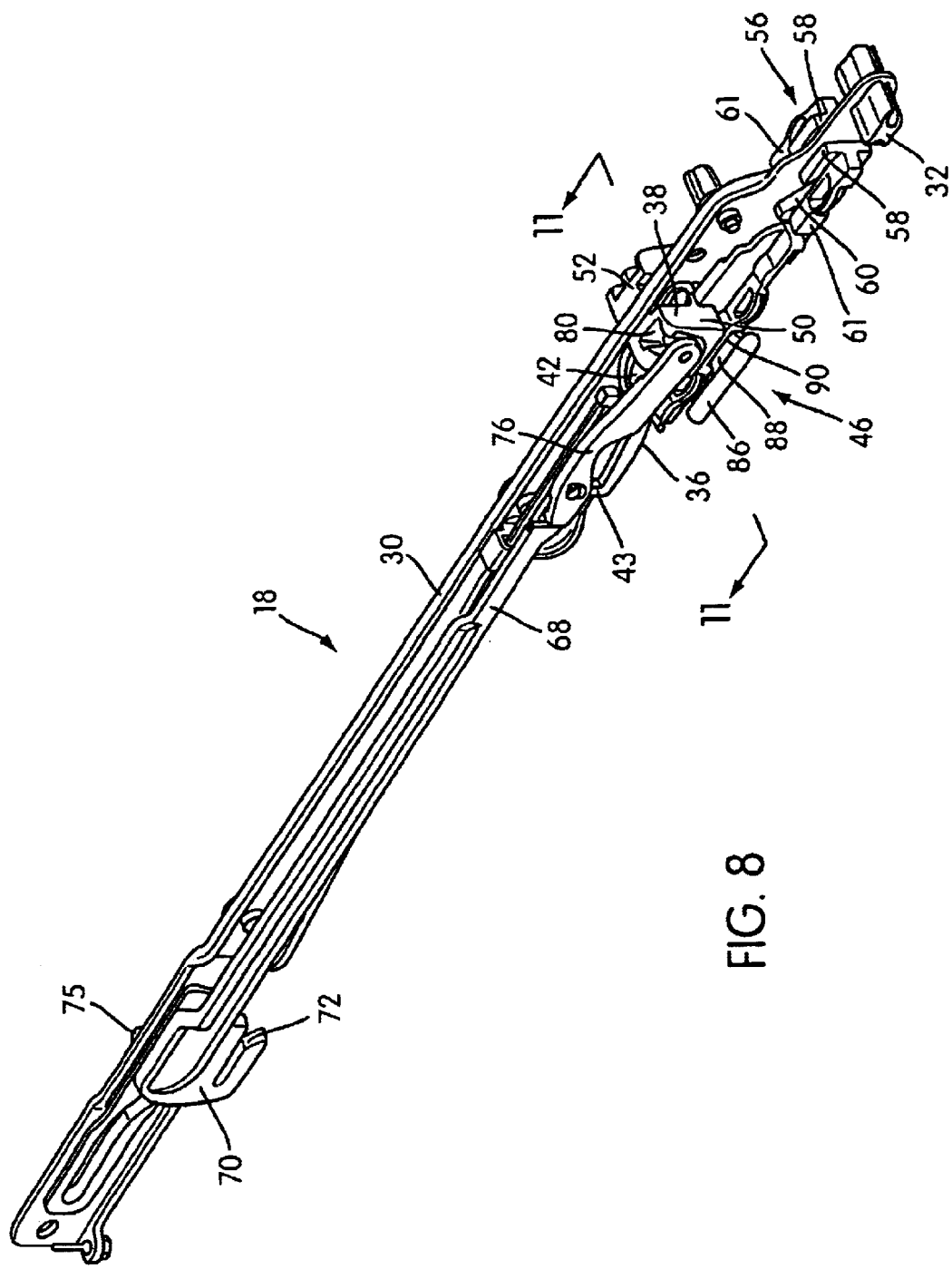

As shown in FIGS. 7 and 8, each lift arm 18 may have a lifting cam structure 46 coupled thereto. Shown in greater detail in FIGS. 9 and 10, each lifting cam structure 46 includes a generally horizontally extending track engaging portion 48 that slidably engages within a track portion 49 (FIG. 11) of the track member 28. Each lifting cam structure 46 includes a pair of horizontally spaced trolley engaging portions 96 depending from the track engaging portion 48. Each trolley engaging portion 96 defines thereon a generally rearwardly and upwardly facing ramped surface 97 thereon. Additionally, the track engaging portion 48 provides a pair of generally forwardly and downwardly facing ramped surfaces 101 thereon, which are spaced rearwardly from and parallel to the ramped surfaces 97. The spaced ramped surfaces 97, 101 define a lock block receiving recess 103 therebetween.

The lifting cam structures 46 each include a pair of upstanding wall members 120, 122 which define an upwardly open, longitudinally extending channel 124 therebetween. Additionally, each lifting cam structure 46 includes a pair of spaced support structures 50, 52 extending upwardly from the upstanding wall members 120, 122.

Figure 9:
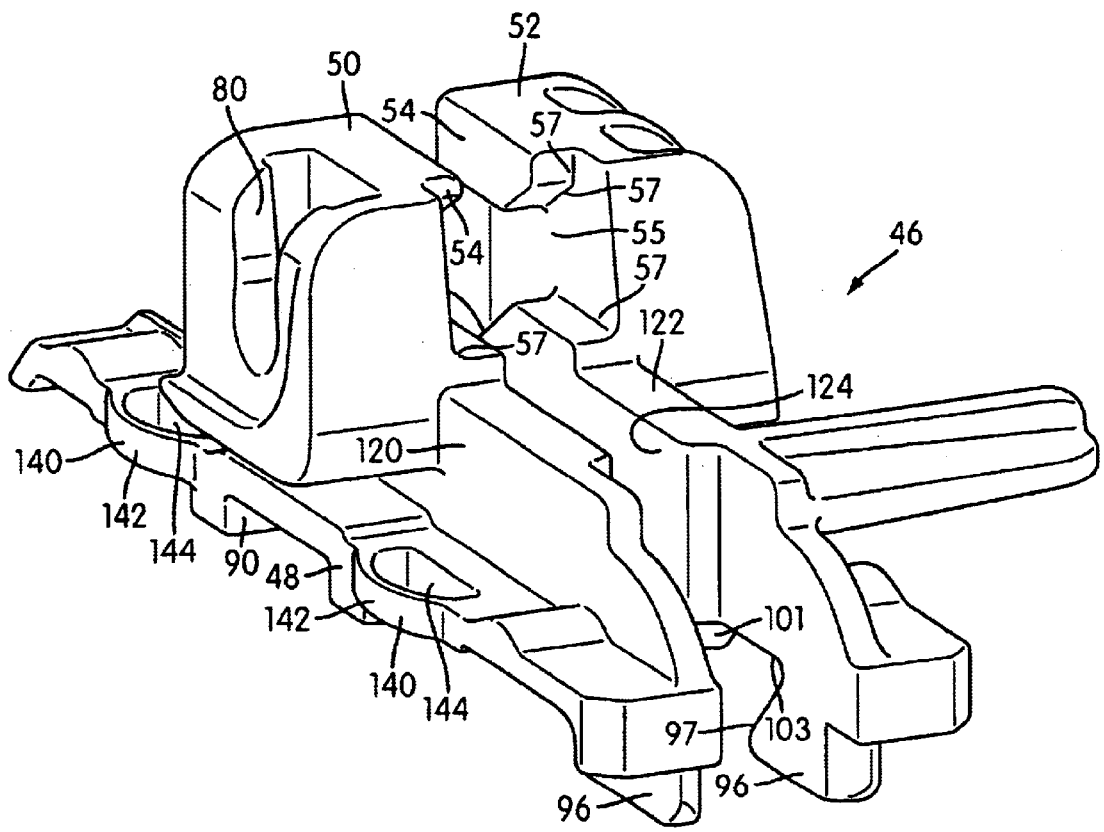
FIGS. 9 and 10 are perspective views of the lifting cam structure shown in FIGS. 7 and 8.
Figure 10:
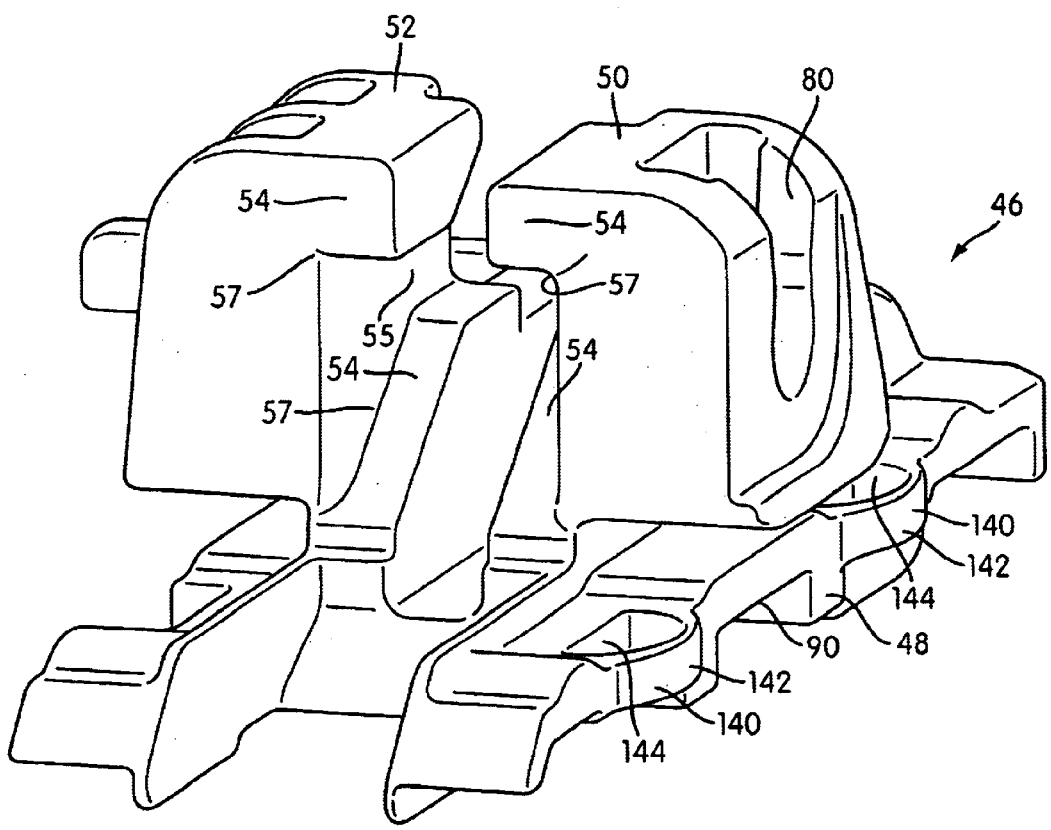
Figure 11:
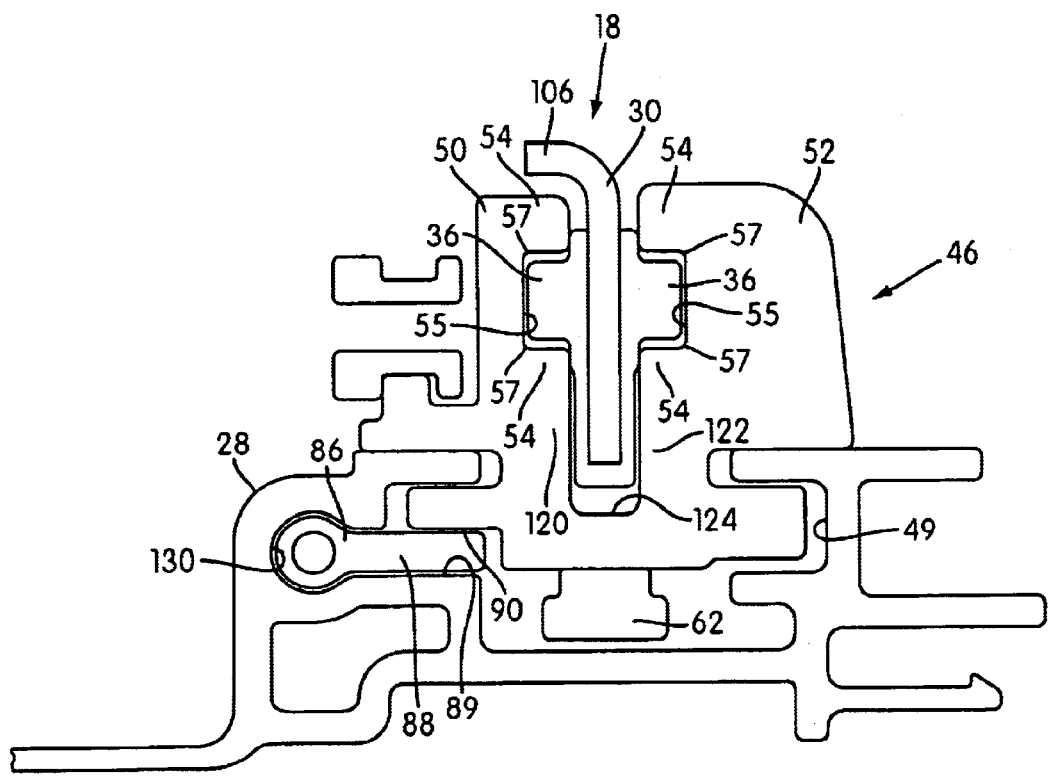
FIG. 11 is a cross-sectional view of the lift arm and track member taken along line 11—11 in FIG. 8.

As also shown in FIGS. 9 and 10, the support structures 50, 52 include vertically spaced pairs of cam engaging portions 54, defining confronting, generally horizontally extending channel portions 55. As shown in FIG. 11, when assembled together, the lift arm 18 is disposed between the spaced support structures 50, 52 and upstanding wall members 120, 122 within the channel 124. The cam structures 36 are vertically disposed between the vertically spaced cam engaging portions 54 of the respective support structure 50, 52 within respective channel portions 55. As shown in FIGS. 9–11, intersection portions (e.g., those indicated at 57) defined between the cam engaging portions 54 and the channel portions 55 are preferably formed with relatively large radius fillets to maximize strength of the support structures 50, 52 and to minimize stress concentrations produced within the support structures 50, 52 at these areas.

Referring to FIGS. 9 and 10, the track engaging portions 48 of the lifting cam structures 46 additionally include a pair of resilient structures 140 protruding outwardly from one laterally facing side thereof. As shown, each of the resilient structures 140 provides an arcuate resiliently flexible member 142 having opposite ends thereof connected to the track engaging portion 48. The resilient structures 140 may be integrally formed with the track engaging portions 48 or may, alternatively, be formed separately and subsequently joined thereto. Additionally, the track engaging portions 48 may provide pockets 144 therein disposed interiorly (relative to the track engaging portions 48) of the resilient structures 140. When the lifting cam structure 46 is assembled with the track 28, the flexible members 142 are deflected inwardly toward the track engaging portions 48. It is contemplated that portions of the flexible members 142 may enter the pockets 144 when deflected. The resilient structures 140 facilitate maintaining a parallel relationship between the lifting cam structures 46 and the tracks 28. Additionally, the resilient structures 140 partially absorb any side and/or thrust loading on the lift arms 18.

With the arrangement described above and illustrated in the Figures, each lift arm 18 is stably supported by the respective lifting cam structure 46, which is stably supported by the track member 28. Particularly, the lifting cam structures 46 are coupled to each lateral side of the lift arms 18 via the cam structures 36. Additionally, the arm portions 30 are disposed between the upstanding wall members 120, 122 of the lifting cam structures 46, which arrangement serves to provide additional lateral support to the lift arms 18. In this manner, the lift arms 18 are substantially prevented from lateral deflection and thus are less prone to being damaged by excessive lateral and/or torsional deflection as compared to prior art mechanisms.

The lifting cam structures 46 may be formed from a metal, polymer, or composite material, such as by machining, molding, or casting. Any other suitable material and process may also be used. However, it may be preferable for the material of the lifting cam structures 46 to have a relatively low coefficient of friction to facilitate sliding movement of thereof along the tracks 28. Additionally, it may be preferable for the material of the lifting cam structures 46 to provide relatively durable sliding surfaces on which the lifting cam structures 46 slide on the tracks 28 so as to help prolong the operational life of the assembly 10.

FIGS. 7 and 8 also show a trolley structure 56. The trolley structure 56 is coupled to the arm portion 30 via the lug numbers 34 and is disposed relative to the arm portion 30 between the connecting structure 32 and the lifting cam structure 46.

Figure 12:
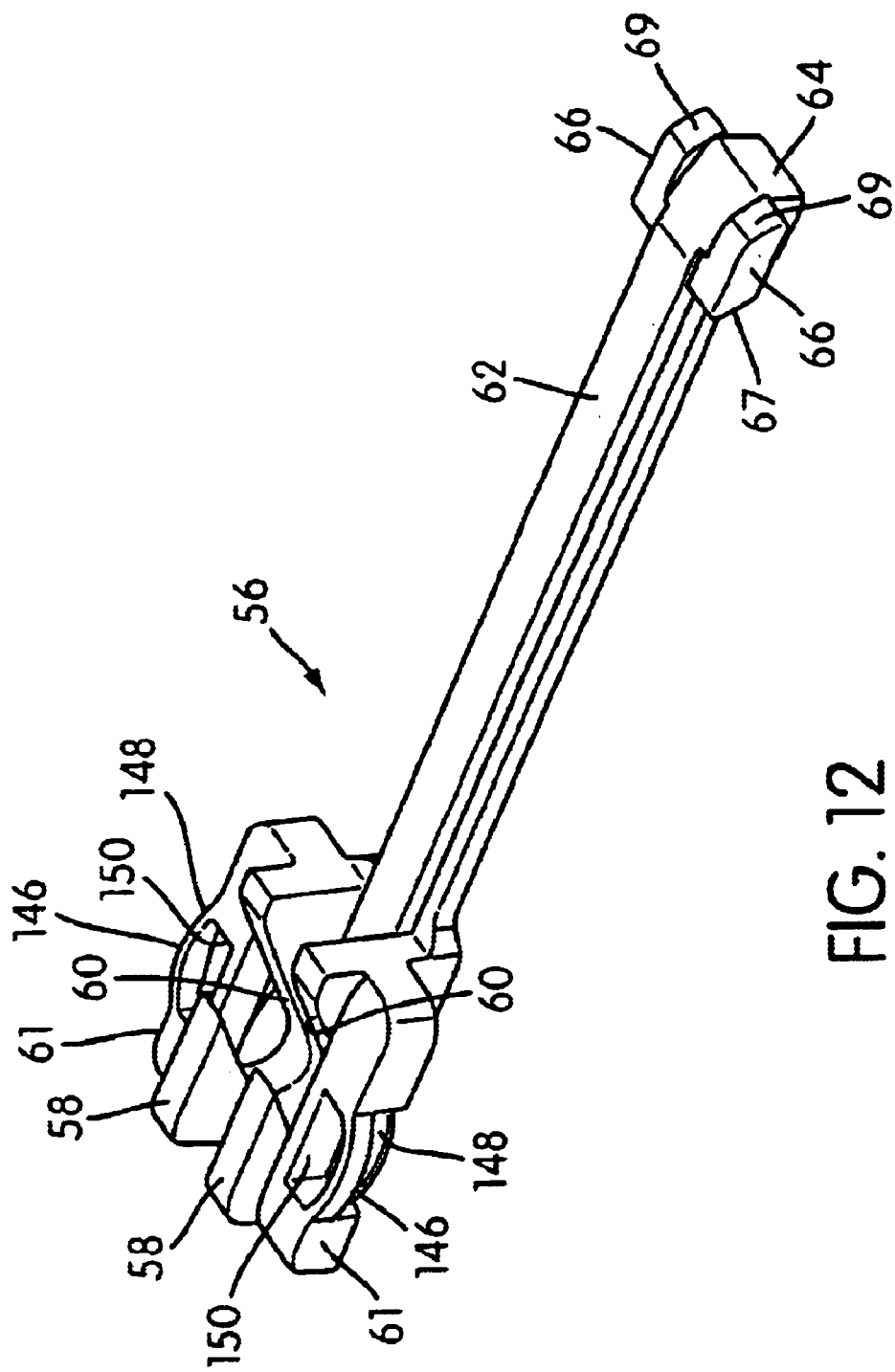
FIG. 12 is a perspective view of the trolley structure shown in FIGS. 7 and 8.

FIG. 12 shows the trolley structure 56 in greater detail including a pair of laterally spaced wall members 58. Each of the wall members 58 have formed therein an angled slot 60 that is configured to receive the respective lug members 34 of the arm portion 30. The slots 60 form generally upwardly and rearwardly facing recesses within which the respective lug members 34 of the arm portion 30 are disposed, as shown in FIGS. 7 and 8. As also shown in FIGS.

7 and 8, when assembled together, the forward portion 100 of the arm portion 30 is disposed between the wall members 58. Referring back to FIG. 12, the trolley structure 56 additionally includes a pair of horizontally extending track engaging portions 61, which are slidably mounted within the track portion 49.

As shown in FIG. 12, the trolley structure 56 additionally includes an integrally formed longitudinally extending locking structure 62. The locking structure 62 extends outwardly from the trolley structure in a rearward direction relative to the arm portion 30. On a rearward end portion of the locking structure 62, a lock block 64 extends downwardly therefrom. The locking structure 62 includes a pair of ramped structures 66 formed on each lateral side of the lock block 64. Each ramped structure 66 defines a generally forwardly and downwardly facing ramped surface 67 thereon. Each ramped structure 66 also defines a generally rearwardly and upwardly facing ramped surface 69 thereon. The integral nature of the locking structure 62 and trolley structure 56 serves to reduce componentry of the sunroof mechanism 10.

Additionally, the track engaging portions 61 of the trolley structure 56 each include a resilient structure 146 protruding laterally outwardly therefrom. As shown, each of the resilient structures 146 provides an arcuate resiliently flexible member 148 having opposite ends thereof connected to the track engaging portion 61. The resilient structures 146 may be integrally formed with the track engaging portions 61 or may, alternatively, be formed separately and subsequently joined thereto. Additionally, the track engaging portions 61 may provide pockets 150 therein disposed interiorly (relative to the track engaging portions 61) of the resilient structures 146. When the trolley structure 56 is assembled with the track 28, the flexible members 148 are deflected inwardly toward the track engaging portions 61. It is contemplated that portions of the flexible members 148 may enter the pockets 150 when deflected. The resilient structures 146 facilitate maintaining a parallel relationship between the trolley structures 56 and the tracks 28. Additionally, the resilient structures 146 partially absorb any side and/or thrust loading on the lift arms 18.

The trolley structure 56 may be formed from a metal, polymer, or composite material, such as by machining, molding, or casting. Any other suitable material and process may also be used. However, it may be preferable for the material of the trolley structures 56 to have a relatively low coefficient of friction to facilitate sliding movement of thereof along the tracks 28. Additionally, it may be preferable for the material of the trolley structures 56 to provide relatively durable sliding surfaces on which the trolley structures 56 slide on the tracks 28 so as to help prolong the operational life of the assembly 10.

Figure 13:
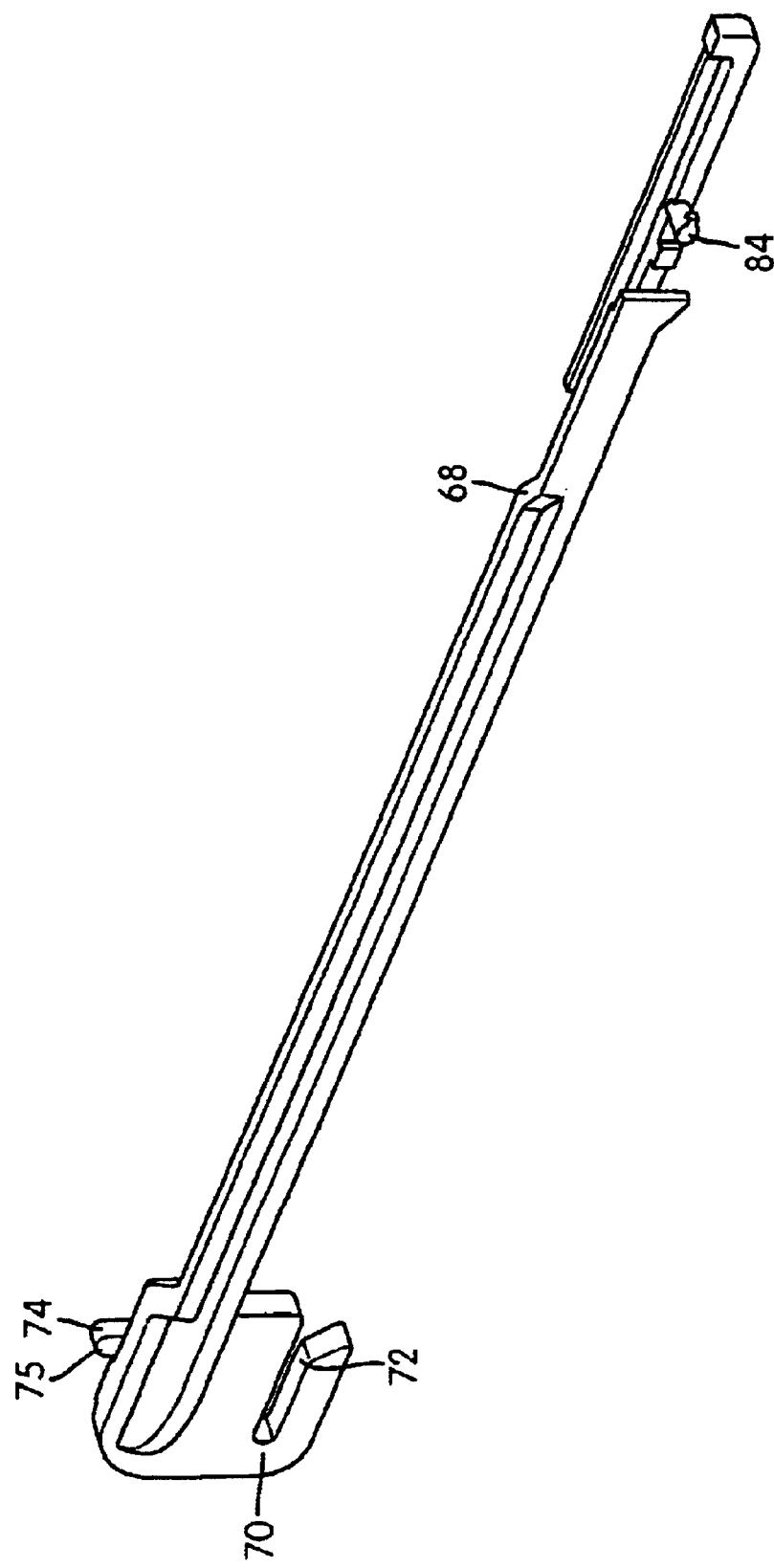
FIGS. 13 and 14 are perspective views of the hold down member shown in FIGS. 7 and 8.
Figure 14:
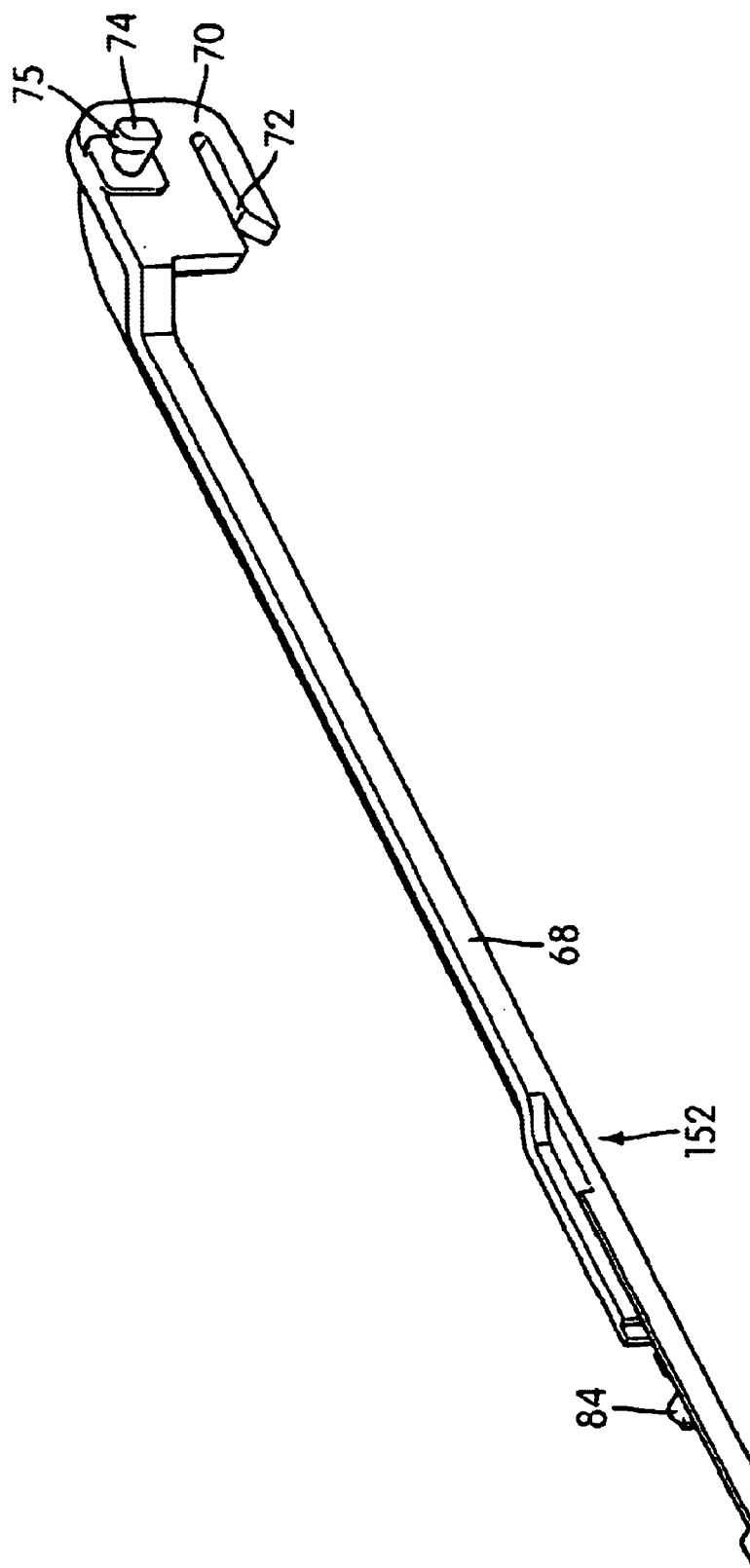

Referring back to FIGS. 7 and 8, a hold down member 68 is slidably connected to one lateral side of each lift arm 18. As shown in FIGS. 13 and 14, a rearward end portion of the hold down member 68 includes a depending lock portion 70. The lock portion 70 includes a generally forwardly facing hook structure 72 formed within a lower portion thereof. Additionally, the hold down member 68 includes a slide member 74 extending horizontally outwardly from a lateral side thereof. An outer end of the slide member 74 includes a flange element 75 extending generally radially outwardly therefrom.

Referring back to FIG. 7, the slide member 74 extends through the slot 44 of the arm portion 30. A side surface of the hold down member 68 abuts a confronting side surface of the arm portion 30 and the flange element 75 abuts an opposite side surface of the arm portion 30 to laterally retain the hold down member 68 in abutting relation with the rearward portion 104 of the arm portion 30.

Figure 14B:
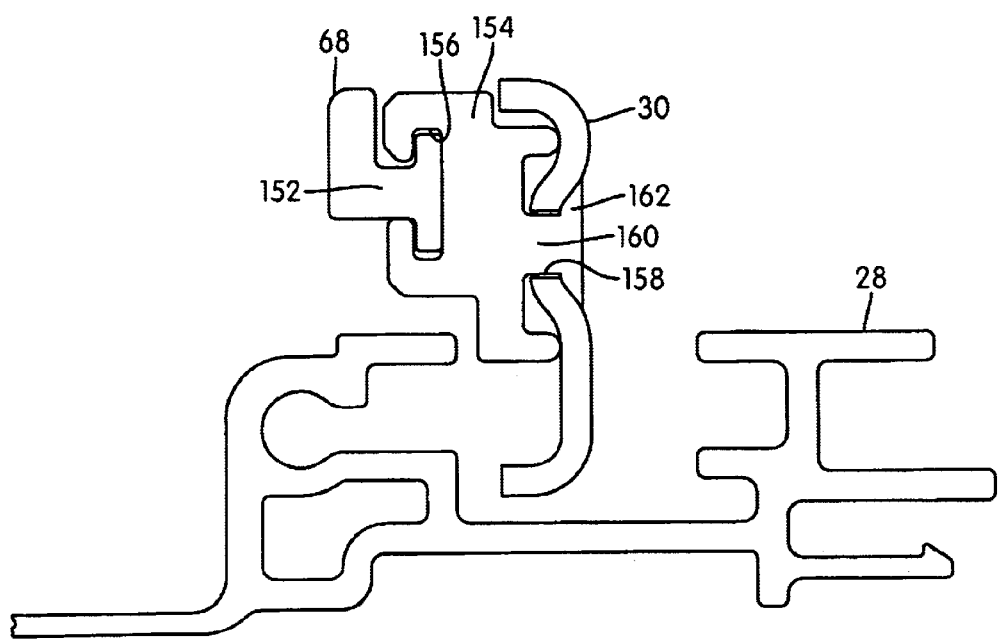
FIG. 14B is a cross-sectional view of one of the lift arms and the track member, taken along line 14B—14B in FIG. 14A.

A forward end portion of the hold down member 68 includes a slide portion 152, shown in FIG. 14, that is slidably engaged with a connecting structure 154 on the arm portion 30, as illustrated in FIG. 14A. FIG. 14B shows this sliding connection in greater detail. As shown, the connecting structure 154 provides a generally T-shaped channel 156 extending therethrough in a direction generally parallel to the hold down member 68. As also shown, the slide portion 152 of the hold down member 68 is also generally T-shaped, so as to be slidably received within the T-shaped channel 156. Referring back to FIG. 14, the slide portion 152 provides an extent of sliding movement of the hold down member 68 relative to the arm portion 30 sufficient to engage/disengage the hook structure 72. In this manner, the hold down member 68 is capable of relative sliding movement and is substantially securely retained by the connecting structure 154. The connecting structure 154, therefore, is preferably relatively securely attached to the arm portion 30. For example, as shown in FIG. 14B, the arm portion 30 may include an opening 158 extending therethrough and the connecting structure 154 may include a stud element 160 extending therefrom. It is contemplated that the connecting structure 154 may be attached to the arm portion 30 by moving the connecting structure 154 into abutting relation with a side of the arm portion 30 such that the stud element 160 passes within the opening 158. A distal end 162 of the stud element 160 may then be deformed, such as by a staking process, to expand the distal end 162, as illustrated in FIG. 14B. It is also contemplated that the connecting structure 154 may be over-molded onto the arm portion 30.

The hold down member 68 may be formed from a metal, polymer, or composite material, such as by machining, molding, or casting. Any other suitable material and process may also be used.

Figure 15:
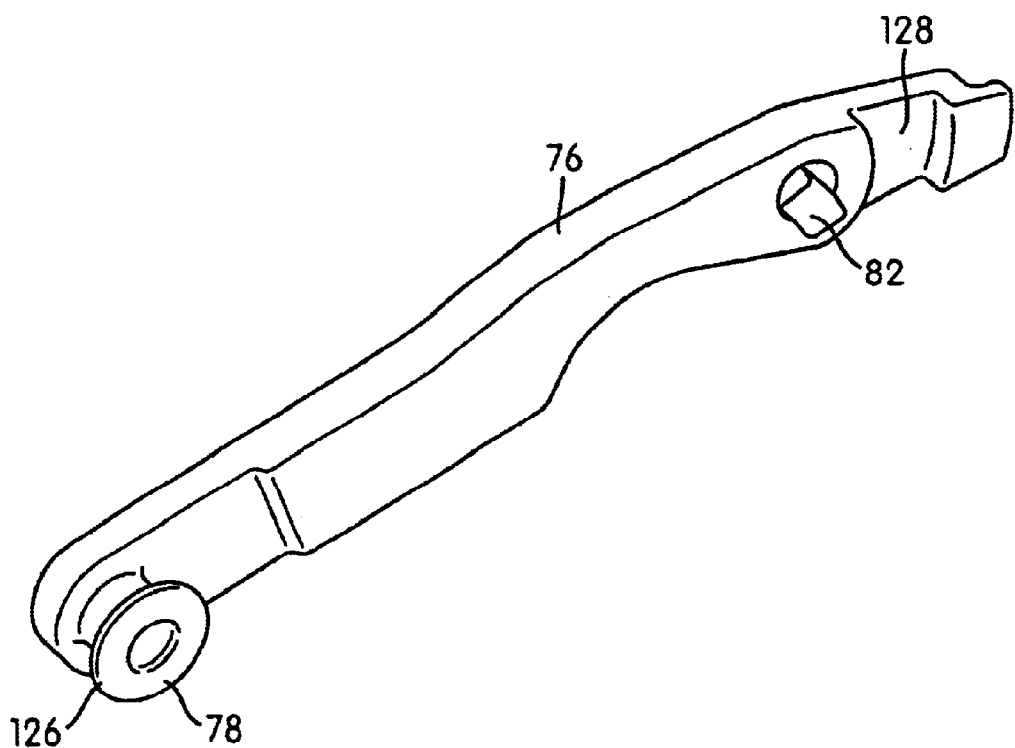
FIG. 15 is a perspective view of a linkage member shown in FIG. 8.

As shown in FIG. 8, a linkage member 76 may be utilized to couple the hold down member 68 with the lifting cam structure 46. In particular, as shown in FIG. 15, a forward end of the linkage member 76 is formed with a laterally protruding tab structure 78 extending from a lateral side thereof. The tab structure 78 may include a peripheral flange 126 on an outermost end thereof. As shown in FIG. 8, the tab structure 78 is received within a generally upwardly facing recess 80 within the support structure 50 of the lifting cam structure 46. It is contemplated that the connection between the recess 80 and tab structure 78 may be a snap-fit type. A rearward end of the linkage member 76 may be formed with a generally horizontally extending recess 82 (FIG. 15) therein. As shown, the recess 82 may be have a key-hole configuration to accept therein a keyed post structure 84 (FIG. 14) extending laterally outwardly from the hold down member 68. In this manner, the linkage member 76 may be secured to the hold down member 68. Additionally, the linkage member 76 may have formed therein a cut-out portion 128.

Figure 16:
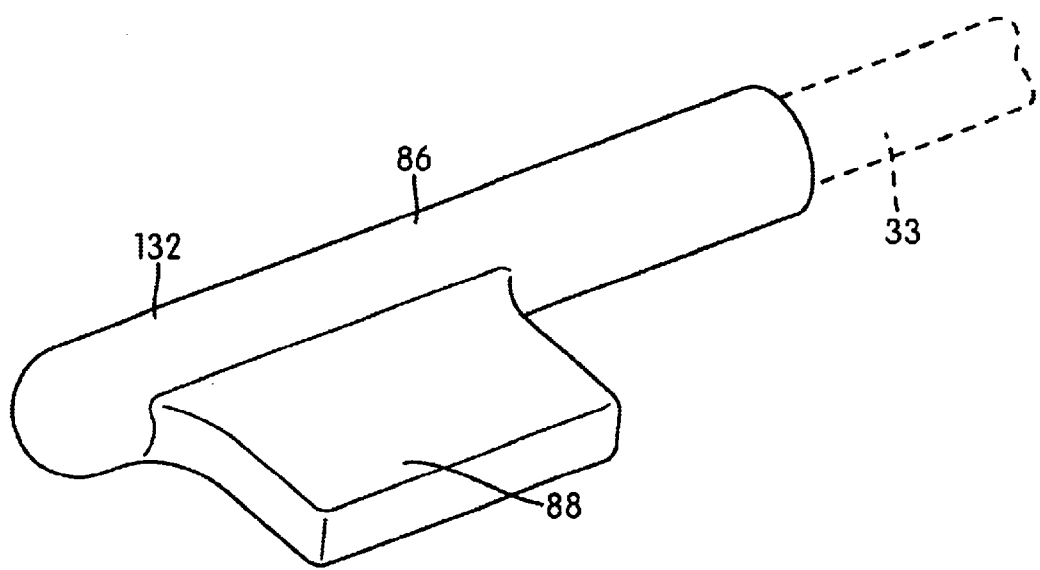
FIG. 16 is a perspective view of a cable securing structure.

To couple the lifting cam structures 46 to the drive mechanism 29, such as via cables 33 (FIG. 4), cable securing structures 86 may be connected to each lifting cam structure 46, as shown in FIGS. 8 and 11. In particular, the cable securing structure 86 includes a generally laterally outwardly extending flange element 88, as shown in FIG. 16, which is received and retained within a corresponding receptacle 90 within the lifting cam structure 46, as shown in FIG. 9. In particular, the receptacle 90 is formed within the track engaging portion 48.

Referring to FIG. 11, the track members 28 are formed with a track portion 89 within which the cable securing structures 86 are slidable relative to the track members 28. The track portions 89 have semi-circular portions 130 to accept corresponding cylindrical portions 132 of the cable securing structures 86. In this manner, moving force may be applied to the lifting cam structures 46 from the driving mechanism 29 (and e.g., cables 33) via the cable securing structures 86.

Operation

The lift arms 18 are moved into various positions corresponding to the positions of the sunroof panel 12. For explanatory purposes, the positions of the lift arms 18 referred to herein are described as closed, vent, and open positions, which generally correspond to the corresponding closed, vent, and open positions of the sunroof panel 12.

Figure 17:
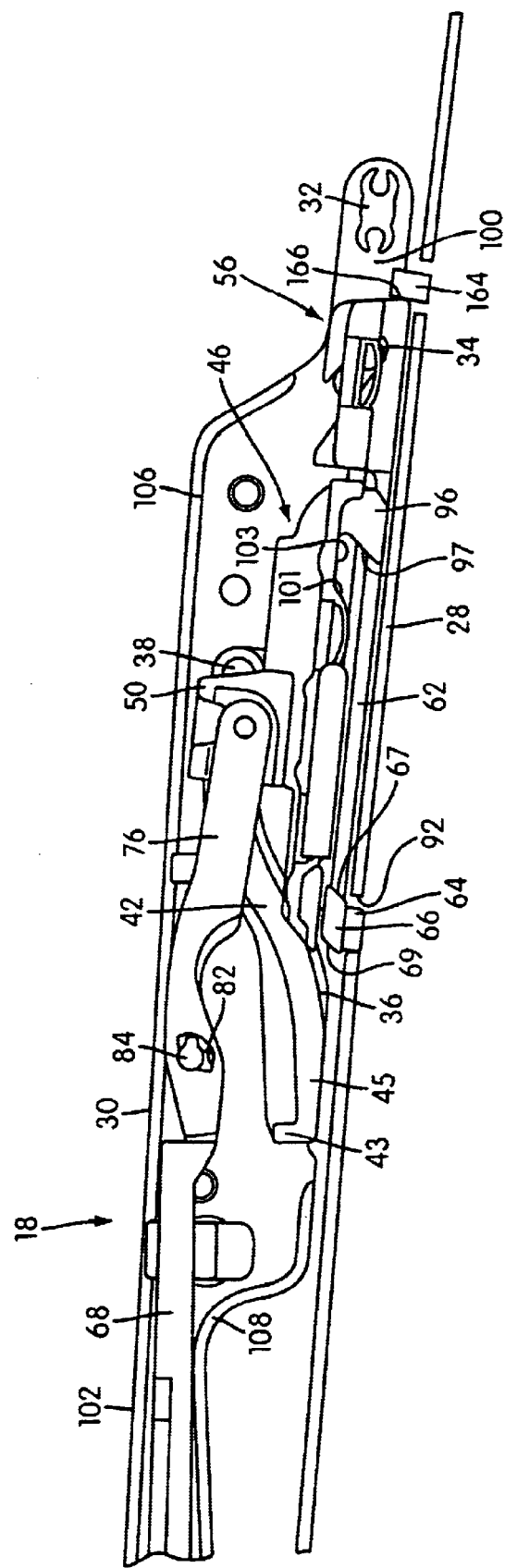
FIG. 17 is a side view of the lift arm shown in FIGS. 7 and 8 when in the closed position.
Figure 17A:
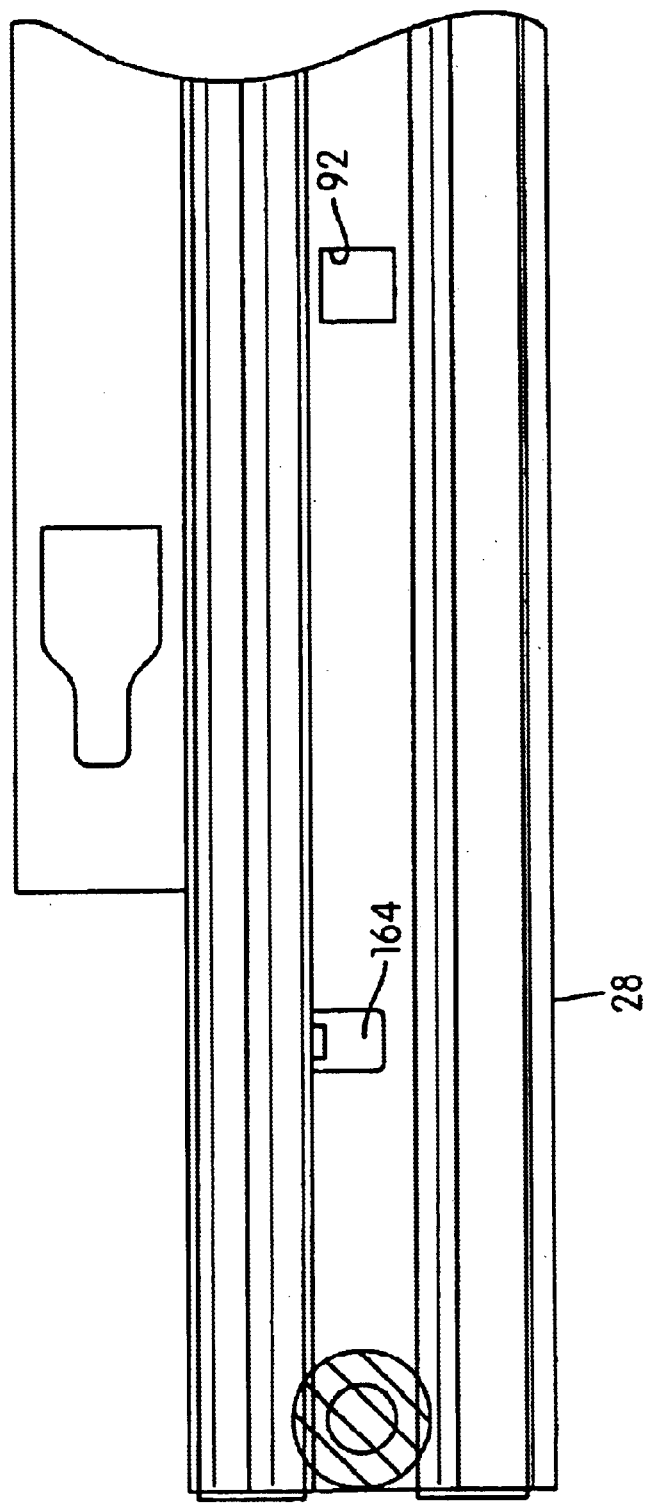
FIG. 17A is a partial top plan view of a forward portion of the track member.
Figure 18:
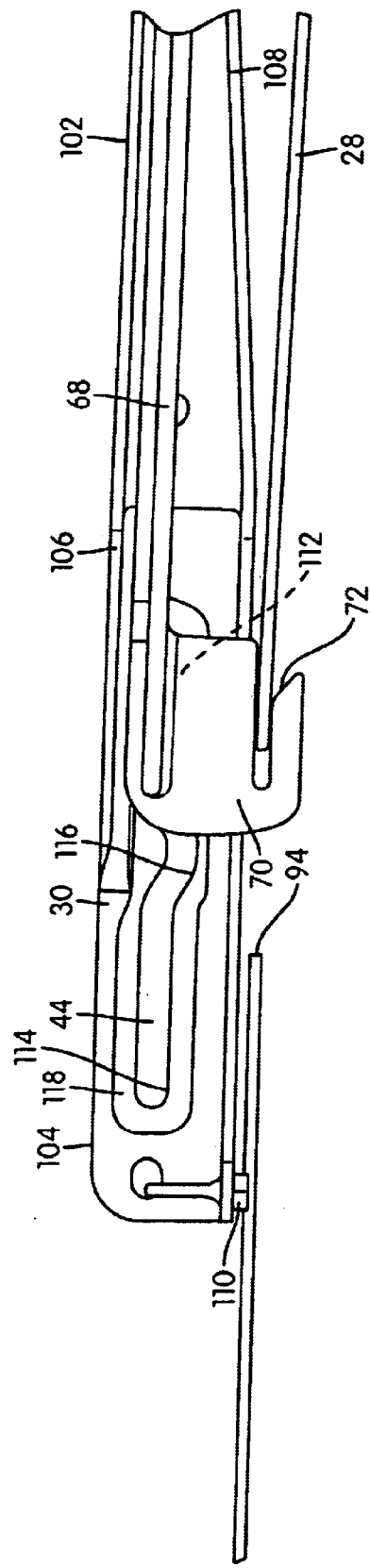
FIG. 18 is a side view of the lift arm when in the closed position.

FIGS. 17 and 18 show one of the lift arms 18 in the closed position relative to the track member 28 corresponding to the closed position of the sunroof panel 12 (not shown in FIGS. 17 and 18). As shown in FIG. 17, when in the closed position, the lift arms 18 are disposed generally parallel to the track members 28. The lifting cam structures 46 are positioned relative to the arm portions 30 such that the cam engaging portions 54 of the support structures 50, 52 are engaged with camming surfaces of the forward portion 38 of the cam structures 36. In particular, a front stop structure 164 protrudes upwardly from the track member 28, as shown in FIGS. 17 and 17A. A forward edge 166 of the trolley structure 56 engages the stop structure 166 164, thereby defining the fully closed position. Additionally, the lock blocks 64 of the trolley structures 56 are disposed within vertically extending apertures 92 within the track members 28. The engagement between the lock blocks 64 and apertures 92 prevents relative sliding movement between the trolley structures 56 and track members 28 and, therefore, between the lift arms 18 and track members 28.

Figure 18A:
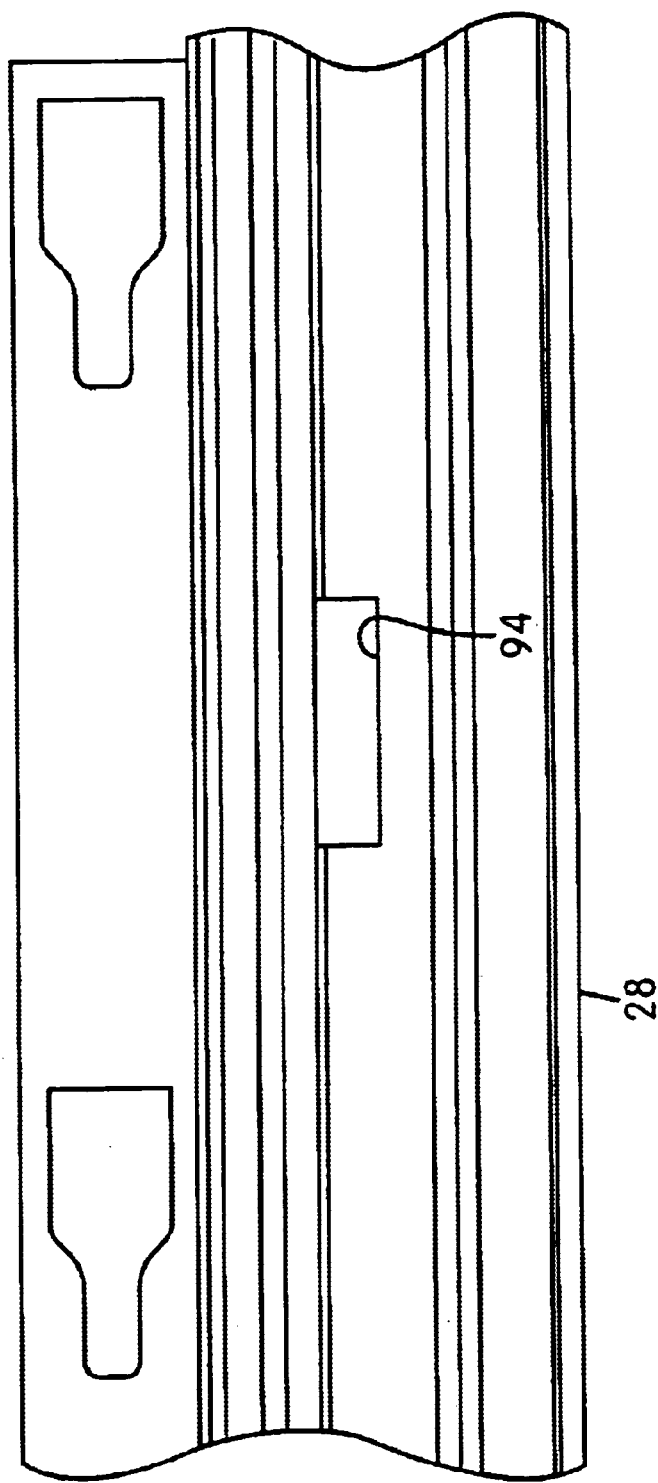
FIG. 18A is a partial top plan view of a rearward portion of the track member.

As shown in FIG. 18, the hold down members 68 are positioned relative to the lift arms 18 such that the slide members 74 are disposed within forward portions 112 of the slots 44. Additionally, the lock portions 70 are disposed within apertures 94 within the track members 28, shown in FIG. 18A, and the hook structures 72 are engaged with lip portions of the track members 28 forward of the apertures 94. In this manner, the lift arms 18 are prevented from pivotal movement about the connecting structures 32 by the locking engagement between the hook structures 70 and lip portions of the track members 28.

To move the sunroof panel 12 into the vent position from the closed position, the hook structures 70 are disengaged from the lip portions of the track members 28. To effect this disengagement, the driving mechanism 29 moves the lifting cam structures 46 rearwardly along the track members 28 relative to respective lift arms 18 and trolley structures 56. The sliding movement of the lifting cam structures 46 effects rearward sliding movement of the hold down members 68. The extent of sliding movement of the hold down members 68 needed to disengage the hook structures 70 from the apertures 94 corresponds to an effective length of the forward portions 38 of the cam structures 36. This extent of sliding movement is further defined by an effective length of the slide portions 152 of the hold down members 68. Since the forward portions 38 are substantially parallel to the direction of sliding movement of the lifting cam structures 46, no significant amount of pivotal movement of the lift arms 18 occurs during movement of the lifting cam structures 46 along to the forward portions 38 of the cam structures 36. Upon reaching the arcuate portions 116 of the slots 44, the slide members 74 are guided slightly downwardly due to the curvature of the arcuate portions 116 and move the locking portions 70 slightly downwardly. It is contemplated that this downward movement may facilitate disengagement of the hook structures 72 from the lip portions of the track members 28.

Figure 19:
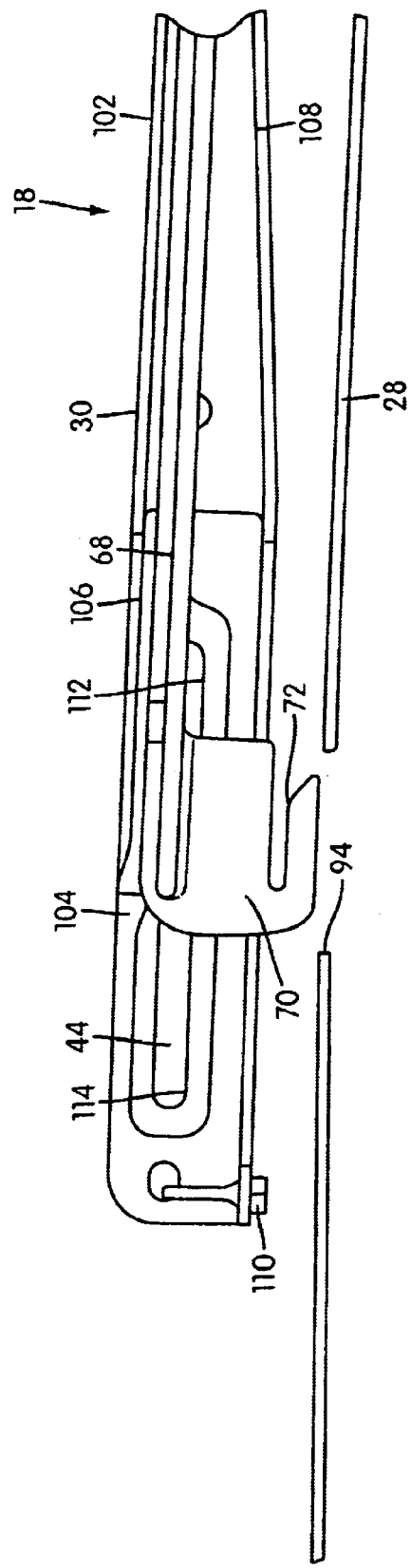
FIG. 19 is a side view of the lift arm shown in FIG. 18 shown between closed and vent positions.
Figure 19A:
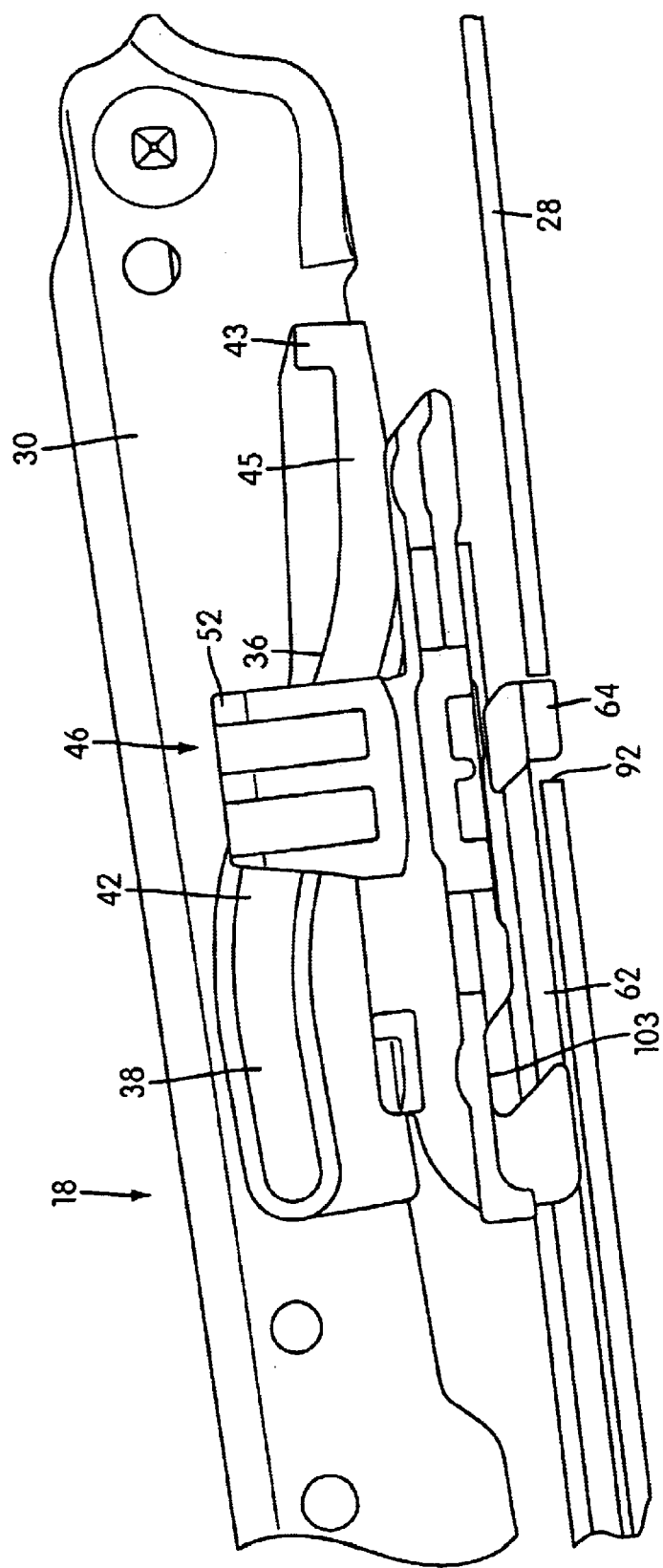
FIG. 19A is a partial side view of the arm portion and lifting cam structure between closed and vent positions.

FIG. 19 shows the hook structures 72 disengaged from the lip portions of the track members 28 and the lift arms 18 in a position between the closed and vent positions thereof. Once disengaged, or unlocked, pivotal movement of the lift arms 18 is affected by moving the lifting cam structures 46 farther rearwardly along the track members 28. When the cam engaging portions 54 of the support structures 50, 52 of the lifting cam structures 46 engage the arcuate intermediate portions 42 of the cam structures 36, as shown in FIG. 19A wherein the lift arm 18 is shown in a position between the closed position and vent position, a camming action is created between the cam engaging portions 54 and camming surfaces of the cam structures 36. Due to the angled orientation of the arcuate intermediate portions 42, sliding movement of the lifting cam structures 46 relative to the lift arms 18 affects pivotal movement of the lift arms 18 about the connecting structures 32. As the lock blocks 64 of the trolley structures 56 remain engaged with the apertures 92, the lift arms 18, and therefore the sunroof panel 12, are prevented from sliding movement relative to the track members 28 during movement of the lifting cam structures 46 along the arcuate intermediate portions 42 of the cam structures 36.

An extent of pivotal displacement of the sunroof panel 12 is determined by a vertical extent of the arcuate intermediate portions 42 of the cam structures 36. A rate of pivotal displacement of the sunroof panel 12 is dependent on a rate of linear displacement of the lifting cam structures 46 and on the relative slope of the arcuate intermediate portions 42. In other words, as the slope of the arcuate intermediate portions 42 increase (i.e., become more vertically directed), the rate of displacement of the sunroof panel 12 correspondingly increases (given that the rate of linear displacement of the lifting cam structures 46 remains constant). Additionally, a degree of torque applied on the lift arms 18 by the lifting cam structures 46 may be manipulated by altering the degree of slope of the arcuate intermediate portions 42. For example, if the slope of the arcuate intermediate portions 42 is decreased (i.e., made less steep), a greater amount of torque may be applied to the lift arms 18, given the same linear displacement of the lifting cam structures 46. However, in this case, the rate of displacement of the sunroof panel 12, as well as the extent of pivotal displacement of the lift arms 18, may correspondingly be decreased. For another example, if the slope of the arcuate intermediate portions 42 is increased (i.e., made more steep), a lesser amount of torque may be applied to the lift arms 18, however, the rate of pivotal displacement of the lift arms 18, as well as the extent of pivotal displacement thereof, may be increased. Accordingly, these variables may be controlled so as to provide a desired degree of displacement and rate of displacement of the sunroof panel 12.

Figure 21:
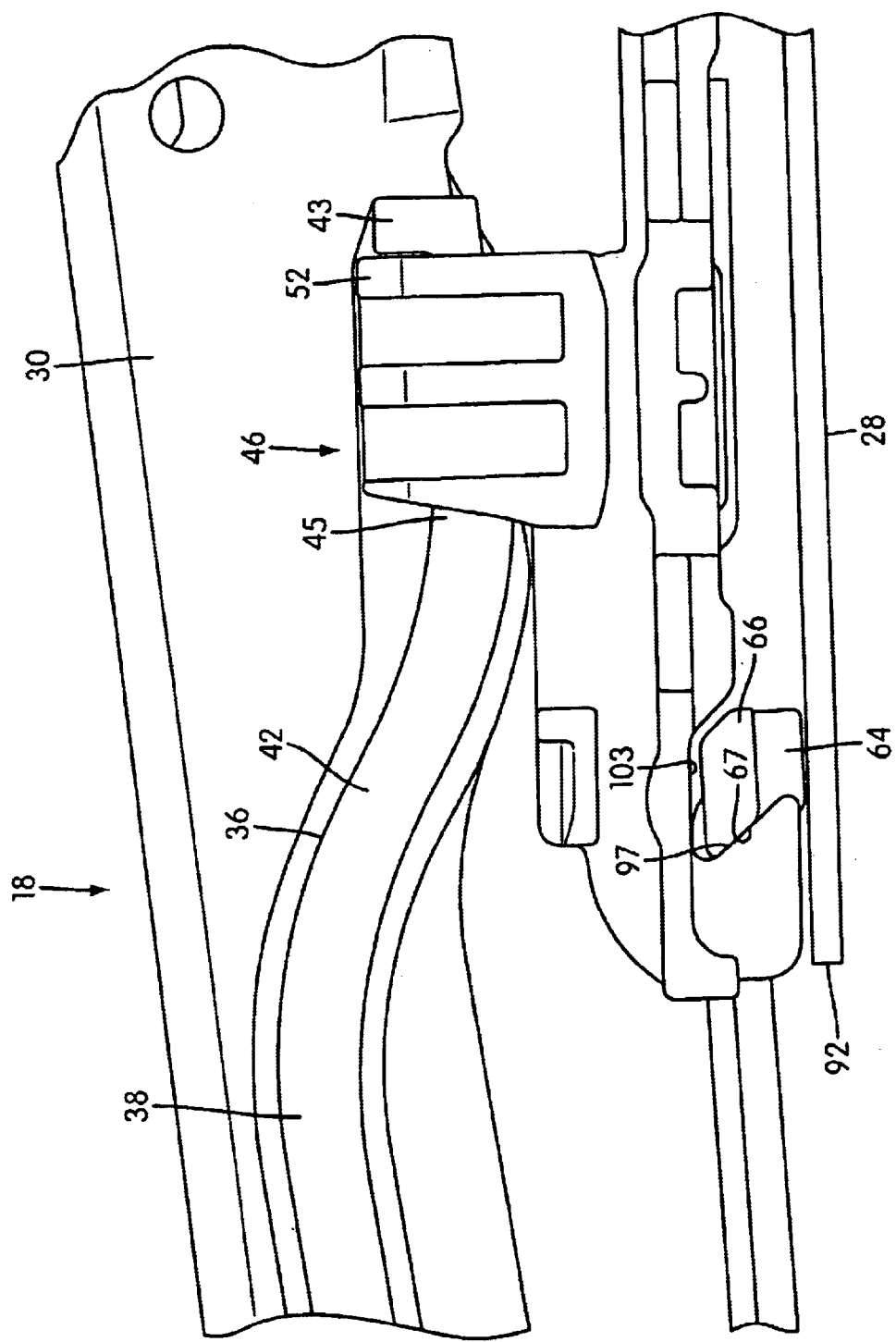
FIG. 21 is a side view of the lift arm between vent and open position.

FIGS. 20 and 21 (illustrating respective sides of one of the lift arms 18) show the lift arm 18 in the vent position thereof. As shown, the lock block 64 is disposed within and therefore lockingly engaged with the aperture 92, so as to prevent sliding movement of the trolley structure 56 and the arm portion 30. Additionally, the lifting cam structure 46 is moved rearwardly relative to the cam structures 36 such that the support structures 50, 52 are disposed at the rearward portion 45 of the cam structures 36. At this point, the arm portions 30 are substantially in their maximum pivotably displaced positions (refer to FIG. 2).

Further movement of the lifting cam structures 46 in the rearward direction effects movement of the arm portions 30 toward the open positions thereof. In particular, when in the vent positions, the ramped surfaces 97 of the track engaging portions 48 are in abutting relation with the ramped surfaces 67 of the lock blocks 64 of the trolley structures 56. Sliding movement of the lifting cam structures 46 in the rearward direction effects a ramping interaction between the ramped surfaces 97 of the trolley engaging portions 96 and the ramped surfaces 67 of the lock blocks 64, which causes the trolley structures 56 to pivot slightly, so that the lock blocks 64 lift out of the apertures 92. As shown in FIG. 21, when lifted out of the apertures 92, the ramped structures 66 are received within the lock block receiving recesses 103 such that the lock blocks 64 are able to clear the apertures 92 and therefore allow the trolley structures 56 to slide within the track members 28. The ramped structures 66 and the lock block receiving recesses 103 are configured to cooperate such that, as the ramped structures 66 move into their fully ramped positions, as shown in FIG. 21, the support structures 50, 52 move into abutting engagement with the stop structures 43 of the cam structures 36. Once engaged, further rearward sliding movement of the lifting cam structures 46 effectively pulls the arm portions 30 and the trolley structures 56 via the engagement of the lifting cam structures 46 with the stop structures 43 and with the ramped structures 66. In particular, the ramped surfaces 97 of the trolley engaging portions 96 pull on the ramped surfaces 67 of the lock blocks 64 and the support structures 50, 52 pull on the stop structures 43 to move the trolley structures 56 and lift arms 18. The lift arms 18 and sunroof panel 12 may then be moved into the open position.

From the open position, the sunroof panel 12 is returned to the vent position thereof by effecting forward movement of the lifting cam structures 46 along the track members 28. Upon forward movement of the lifting cam structures 46, the ramped surfaces 101 of the lifting cam structures 46 abut the ramped surfaces 69 of the ramped structures 66. Due to a ramping interaction between the surfaces 101, 69 a downward force is exerted on the lock blocks 64. Additionally, the abutment between the surfaces 101, 69 serves to push the trolley structures 56 and, therefore, the lift arms 18 forwardly along the track members 28.

Upon reaching the vent position, as shown in FIG. 20, the downward force on the lock blocks 64 (produced by the interaction of the ramped surfaces 101, 69, as described above) urges the lock blocks 64 into the apertures 92. Once the lock blocks 64 drop into the apertures 92, forward movement of the trolley structures 56 and lift arms 18 ceases. Further forward movement of the lifting cam structures 46 effects the downward pivotal movement of the lift arms 18 toward and into the closed position.

As shown in FIG. 19 the depending lock portions 70 of the hold down members 68 are disposed relative to the track members 28 in positions above and generally aligned with the apertures 94 with in the track members 28. At this point, the slide members 74 are disposed within the arcuate portions 116 of the slots 44. As the lift arms 18 are moved into their closed positions, the hook structures 72 are passed through the apertures 94. Subsequently, the lifting cam structures 46 are moved further forwardly along the forward portions 38 of the cam structures 36 on the lift arms 18. During this movement, the slide members 74 are moved forwardly and upwardly within the arcuate portion 116 of the slot 44, which moves the hook structures 72 into engagement with the lip portions of the apertures 94. The upward movement of the slide members 74 translates into the hold down members effectively pulling the lift arms 18 slightly downwardly to provide a good seating of the sunroof panel 12 and the gasket element disposed between the sunroof panel 12 and the roof 16.

Figure 22:
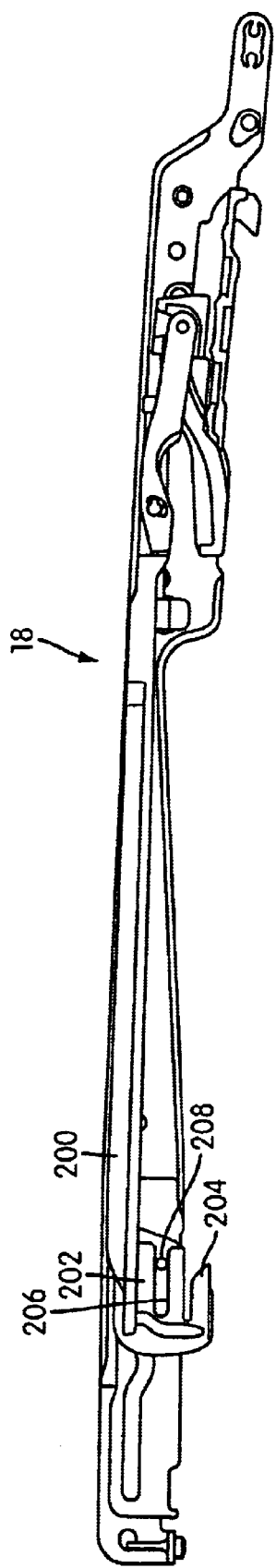
FIG. 22 is a side view of the lift arm with a hold down member of an alternate embodiment.
Figure 23:
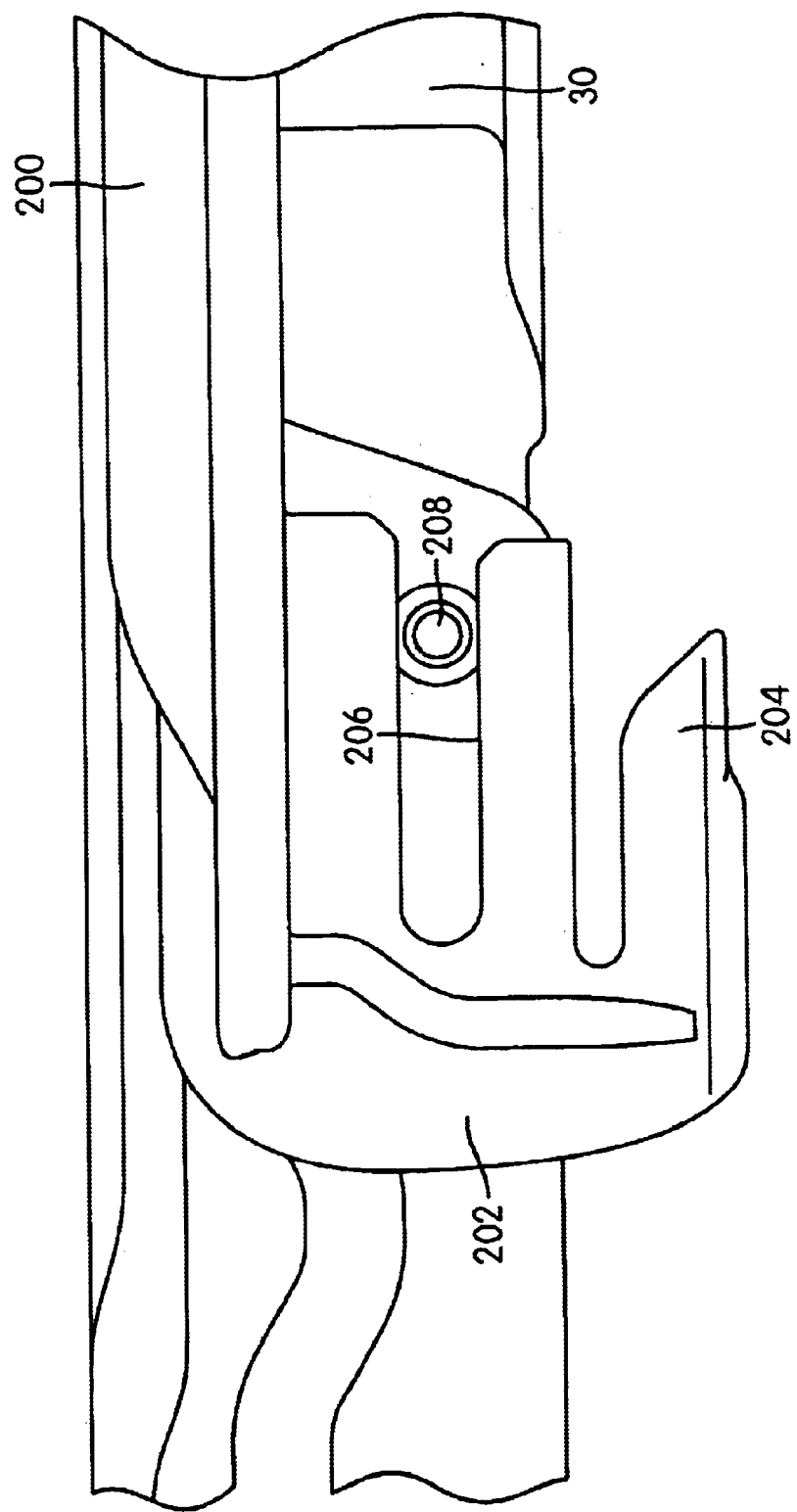
FIG. 23 is a partial side view of the hold down member shown in FIG. 22.
Figure 24:
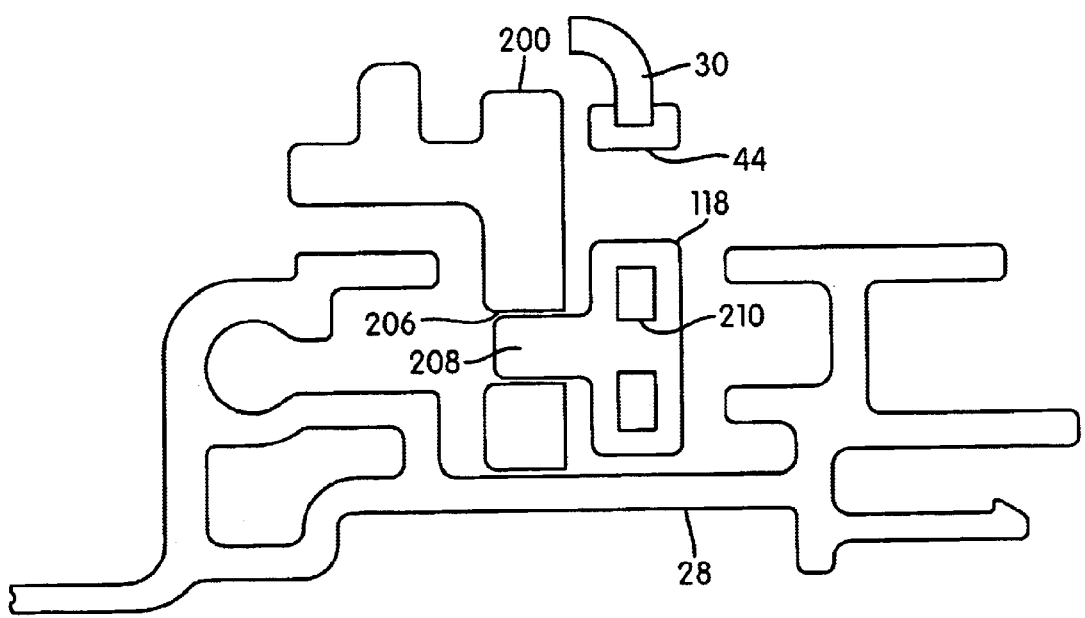
FIG. 24 is cross-sectional view of the lift arm taken about line 24—24 in FIG. 23.

The components of the sunroof assembly 10 described above are merely exemplary in nature and, of course, other variations and modifications are possible. For example, FIGS. 22–24 show one of the lift arms 18 with a hold down member 200 of an alternate embodiment than the hold down member 68 described above. The hold down member 200 may be slidably mounted to the arm portion 30 at forward and rearward ends thereof in a similar manner as the hold down member 68 (e.g., see FIGS. 7 and 14B). However, a lock portion 202 on the rearward end includes a hook structure 204, configured to lockingly engage with the aperture 94 to secure the lift arms 18 in their closed positions, and a guide slot 206, configured to slidingly receive a slide post 208 therein. As shown in greater detail in FIG. 23, the slide post 208 may be substantially circular in configuration and is configured to cooperate within the guide slot 206 to both allow relative sliding movement between the arm portion 30 and the hold down member 200 and to provide an additional degree of support to the hold down member 200. As shown in FIG. 24, the slide post 208 may be formed integrally with the wear member 118. Additionally, an opening 210 may be provided within the arm portion 30 to allow material of the wear member 118 to pass therethrough and thus strengthen the attachment of the slide post 209 to the arm portion 30, especially in a case wherein the wear member 118 is an over-molded polymer member.

While the principles of the present invention have been made clear in the illustrative embodiments set forth above, it will be apparent to those skilled in the art that various modifications may be made to the structure, arrangement, proportion, elements, materials, and components used in the practice of the invention.

What is claimed is:

1. A sunroof assembly for a vehicle having a roof and an opening therein, the sunroof assembly comprising:

a panel structure of a size to close the opening;

a pair of elongate track members extending in a longitudinal direction relative to the vehicle and constructed to be mounted to the roof at side edge portions of the opening;

a pair of lift arms coupled to the panel structure proximate respective side edge portions thereof;

a pair of trolley structures each slidably mounted to a respective track member, each lift arm being pivotally coupled to a respective trolley structure so as to be capable of pivotal vertical movement to move said panel structure relative to said trolley structures and said track members between (a) a closed position wherein said panel structure closes the opening of the roof and (b) a vent position wherein said panel structure is disposed at an angle relative to the opening to provide a vent space between said panel structure and the opening, the slidable mounting of said trolley structures enabling said lift arms and said trolley structures to move together along said track members to move said panel structure between (a) the vent position and (b) an open position wherein said panel structure is moved along said track members to uncover the opening, each lift arm having a cam structure providing a camming surface on each opposing lateral side thereof; and a pair of lifting cam structures slidably coupled to each track member, said lifting cam structures having supports positioned on each lateral side of its respective lifting arm to resist deflection of said lifting arm, said lift cam structures having camming surfaces engaged with the camming surfaces of the cam structures on the opposing lateral sides of the lift arms, said lifting cam structures and said camming surfaces of the lift arms being configured such that sliding movement of the lifting cam structures along the track members relative to said lift arms creates a camming action to raise said lift arms from the closed position to the vent position.

2. A sunroof assembly according to claim 1, wherein each of said lifting cam structures has a track engaging portion that is slidably mounted on a respective track member, and wherein said supports extend generally upwardly from each track engaging portion, said supports having inwardly facing surfaces facing one another providing said camming surfaces.

3. A sunroof assembly according to claim 2, wherein said supports have recesses on said inwardly facing surfaces providing said camming surfaces and wherein said cam structures of said lift arms project outwardly into said recesses.

4. A sunroof assembly according to claim 1 wherein each trolley structure has a lock for locking said trolley structures with the respective track members so as to prevent sliding movement of the the trolley structures along the track member during pivotal movement of said lift arms between said closed and vent positions.

5. A sunroof assembly according to claim 4, wherein each lock includes a downwardly extending lock block that is receivable within an aperture provided within the respective track member, the trolley structures being pivotal relative to the track members between (a) a locked position wherein the lock blocks are received within the apertures to lock the trolley structures relative to the track members, and (b) an unlocked position wherein the lock blocks are withdrawn from the apertures to unlock the trolley structures from the track members.

6. A sunroof assembly according to claim 5, wherein said lifting cam structures are movable along said trolley structures between first and second positions, said camming surfaces of said lifting cam structures camming said camming surfaces of said lift arms cam structures to raise said lift arms from said closed position to said vent position as said lifting cam structures move from said first position to said second position, said lifting cam structures in said first position driving said trolley structures to move said lift arms from said vent position to said open position.

7. A sunroof assembly according to claim 6, wherein each lifting cam structure includes a ramped portion defining a first ramped surface thereon and each locking structure includes a ramp structure defining a first opposing ramped surface facing said first ramped surfaces, the ramped surfaces being configured such that as said lifting cam structures slidably move from the first position thereof to the second position thereof the ramped surfaces engage one another in a camming action to move the lock block from the locked position into the unlocked position.

8. A sunroof assembly according to claim 7, wherein the first ramped surfaces are configured such that subsequent to the lock blocks being moved into the unlocked position thereof, the first ramped surfaces move the trolley structures with said lifting cam structures in the second position thereof to the open position of the panel structure.

9. A sunroof assembly according to claim 8, wherein each lifting cam structure includes a portion thereof defining a second ramped surface thereon and the ramp structure of the trolley structure defines a second opposing ramped surface thereon, the second ramped surfaces being configured such that as said lifting cam structures move from the second position thereof to the first position, the second ramped surfaces engage one another to move the trolley structures until said lifting cam structures reach the vent position thereof and then cam one another to move said lock block into the locked position thereof and said lift arms into said closed position.

10. A sunroof assembly according to claim 9, further comprising a pair of hold down members slidably attached one side of each lift arm for sliding movement relative thereto between (1) a locked position, wherein said hold down members are lockingly engaged With slots in said track members to prevent the panel structure from being moved out of the closed position thereof and (2) an unlocked position, wherein said hold down members are disengaged from said slots so as to allow the sunroof panel to be moved out of the closed position thereof.

11. A sunroof assembly according to claim 10, wherein said hold down members are coupled to respective lifting cam structures so as to be moved between the locked an unlocked positions thereof by said lifting cam structures.

12. A sunroof assembly according to claim 11, wherein said cam structures have guide portions thereof that extend substantially parallel to said track members when the panel structure is in the closed position thereof, said lifting cam structures and said cam structures cooperating such that sliding movement of the lifting cam structures relative to the lift arms traversing said guide portions serves to moves said hold down members between said locked and unlocked positions thereof without effecting pivotal movement of said lift arms.

* * * * *